United States Patent
Khan et al.

(10) Patent No.: US 9,977,972 B2
(45) Date of Patent: May 22, 2018

(54) 3-D MODEL BASED METHOD FOR DETECTING AND CLASSIFYING VEHICLES IN AERIAL IMAGERY

(71) Applicant: SRI International, Menlo Park, CA (US)

(72) Inventors: Saad Masood Khan, Hamilton, NJ (US); Hui Cheng, Bridgewater, NJ (US); Dennis Lee Matthies, Princeton, NJ (US); Harpreet Singh Sawhney, West Windsor, NJ (US); Sang-Hack Jung, Lawrenceville, NJ (US); Chris Broaddus, Philadelphia, PA (US); Bogdan Calin Mihai Matei, Monmouth Junction, NJ (US); Ajay Divakaran, Monmouth Junction, NJ (US)

(73) Assignee: SRI International, Menlo Park, CA (US)

( * ) Notice: Subject to any disclaimer, the term of this patent is extended or adjusted under 35 U.S.C. 154(b) by 534 days.

(21) Appl. No.: 14/519,927

(22) Filed: Oct. 21, 2014

(65) Prior Publication Data
US 2016/0379062 A1    Dec. 29, 2016

Related U.S. Application Data

(63) Continuation of application No. 12/913,861, filed on Oct. 28, 2010.
(Continued)

(51) Int. Cl.
*G06K 9/00* (2006.01)
*G06K 9/46* (2006.01)
(Continued)

(52) U.S. Cl.
CPC ........ *G06K 9/00785* (2013.01); *B64C 39/024* (2013.01); *B64D 47/08* (2013.01);
(Continued)

(58) Field of Classification Search
None
See application file for complete search history.

(56) References Cited

U.S. PATENT DOCUMENTS

| | | |
|---|---|---|
| 7,372,977 B2 | 5/2008 | Fujimura et al. |
| 7,480,414 B2 | 1/2009 | Brown et al. |

(Continued)

OTHER PUBLICATIONS

P. Chang, D. Hirvonen, T. Camus, and B. Southall, "Stereo-based object detection, classification, and quantitative evaluation with automotive applications," IEEE International Workshop on Machine Vision for Intelligent Vehicles, San Diego, 2005.
(Continued)

*Primary Examiner* — Nancy Bitar
(74) *Attorney, Agent, or Firm* — Moser Taboada

(57) ABSTRACT

A computer implemented method for determining a vehicle type of a vehicle detected in an image is disclosed. An image having a detected vehicle is received. A number of vehicle models having salient feature points is projected on the detected vehicle. A first set of features derived from each of the salient feature locations of the vehicle models is compared to a second set of features derived from corresponding salient feature locations of the detected vehicle to form a set of positive match scores (p-scores) and a set of negative match scores (n-scores). The detected vehicle is classified as one of the vehicle models based at least in part on the set of p-scores and the set of n-scores.

11 Claims, 19 Drawing Sheets

Related U.S. Application Data

(60) Provisional application No. 61/256,113, filed on Oct. 29, 2009.

(51) Int. Cl.
*B64C 39/02* (2006.01)
*B64D 47/08* (2006.01)
*G06K 9/62* (2006.01)
*G06T 7/20* (2017.01)
*G06T 7/11* (2017.01)

(52) U.S. Cl.
CPC ....... *G06K 9/00651* (2013.01); *G06K 9/4671* (2013.01); *G06K 9/6269* (2013.01); *G06K 9/6282* (2013.01); *G06T 7/11* (2017.01); *G06T 7/20* (2013.01); *B64C 2201/123* (2013.01); *G06T 2207/10012* (2013.01)

(56) References Cited

U.S. PATENT DOCUMENTS

| | | | |
|---|---|---|---|
| 7,590,262 B2 | 9/2009 | Fujimura et al. | |
| 8,378,816 B2 | 2/2013 | Wagner et al. | |
| 8,913,783 B2* | 12/2014 | Khan | G06K 9/00651 382/103 |
| 9,196,050 B2* | 11/2015 | Wei | G06T 7/0083 |
| 9,652,851 B2* | 5/2017 | Artan | G06T 7/149 |
| 2010/0195774 A1 | 8/2010 | Lopez de Victoria | |
| 2010/0259537 A1 | 10/2010 | Ben-Himane et al. | |
| 2011/0007940 A1* | 1/2011 | Hamza | G06K 9/0063 382/103 |
| 2011/0064303 A1* | 3/2011 | Winn | G06K 9/3233 382/159 |
| 2011/0293173 A1* | 12/2011 | Porikli | G06K 9/4642 382/159 |
| 2012/0207384 A1 | 8/2012 | Porikli et al. | |
| 2015/0310365 A1* | 10/2015 | Li | G06Q 10/0639 705/7.38 |
| 2015/0310615 A1* | 10/2015 | Bulan | H04N 5/23229 348/143 |

OTHER PUBLICATIONS

D. Comaniciu and P.Meer, "Mean shift: A robust approach toward feature space analysis," PAMI, 24:603-619, 2002.
P. Chang, T. Camus, and R. Mandelbaum, "Stereo-based vision system for automotive imminent collision detection," Intelligent Vehicles Symposium, 2004 IEEE, pp. 274-279.
B. Leibe, N. Camelis, and L. V. G. K. Cornelis, "Dynamic 3D scene analysis from a moving vehicle," CVPR, 2007.
D.M. Gavrila and S. Munder, "Multi-cue pedestrian detection and tracking from a moving vehicle," IJCV, 73:41-59, 2007.
A. Shashua, Y. Gdalyahu, and G. Hayun, "Pedestrian detection for driver assistance systems: Single-frame classification and system level performance," In Proc. of the IEEE Intelligent Vehicle Symposium, 2004.
Navneet Dalai and Bill Triggs , "Histograms of Oriented Gradients for Human Detection" In RIA Rh-one-Aips, 655 avenue de I' Europe, Montbonnot 38334, France, 2005.

* cited by examiner

UAV with Mounted Camera

Sensor to World Projection Model

3-D MODEL BASED METHOD FOR DETECTING AND CLASSIFYING VEHICLES IN AERIAL IMAGERY

CROSS-REFERENCE TO RELATED APPLICATION

This application claims the benefit of U.S. patent application Ser. No. 12/913,861 filed on Oct. 28, 2010, which further claims the benefit of U.S. Provisional Patent Application No. 61/256,113 filed Oct. 29, 2009, the disclosures of which are incorporated herein by reference in their entireties.

GOVERNMENT RIGHTS IN THIS INVENTION

This invention was made with U.S. government support under contract number IARPA NBCHC070062. The U.S. government has certain rights in this invention.

FIELD OF THE INVENTION

The present invention relates generally to vision systems, and more particularly, to a method and a digital processing system for real-time or near-real-time automatic video classification of vehicle model types in aerial imagery.

BACKGROUND OF THE INVENTION

The problem of object classification has received considerable attention from both the computer vision and machine learning communities. A key challenge is to recognize any member in a category of objects despite wide variations in visual appearance due to geometrical transformations, change in viewpoint, or illumination. Two dimensional (2D) methods for classification of vehicles have emphasized the use of 2D bag of features or feature constellations from a set of limited (representative) views. In the last decade, the proliferation of 2D methods has been facilitated by the superabundance of images on the Internet as well as the systematic annotation and construction of image benchmarks and corpora. 2D approaches have yielded significant advances in recognition performance, particularly on controlled datasets.

Unfortunately 2D methods are limited in that they cannot leverage the properties of 3D shapes for recognition. The typical 2D method of handling view variance applies several single-view detectors independently and combines their responses via arbitration logic. Some recent work has focused on a single integrated multi-view detector that accumulates evidence from different training views. Such methods have only been successfully attempted with controlled datasets and with broad classification categories.

A more difficult task is to make classification decisions at a very fine level of distinction, e.g., between different types of vehicles rather than a distinction between the class of vehicles and the class of airplanes. For such a task, 2D methods that make broad generalizations over object classes with only a coarse utilization of geometric relations are ill suited and 3D models become indispensable.

Much of the early work in 3D model based recognition included methods for matching wire-frame representations of simple 3D polyhedral objects to detected edges in an image with no background clutter and no missing parts. Such methods further included aligning silhouettes of rendered models with edge information extracted from scene imagery. Unfortunately, this has resulted in mismatches due to faulty edge detection, lack of scene contrast, blurry imagery, scene clutter and noise amongst other factors complicating scene analysis.

Such prior art 3D model based recognition methods have been unable to harness appearance as a rich source of information. To date, there have been no attempts to accurately simulate scene conditions in the rendered model and to compare rendered models with the actual scene. Secondly, like 2D approaches, most of the work in prior art 3D models for classification has been geared towards broad categories of objects rather than a finer analysis, in part due to the limitations of employing silhouettes and edges.

Accordingly, what would be desirable, but has not yet been provided, is a 3D method and system for distinguishing between types of vehicle models in aerial imagery.

SUMMARY OF THE INVENTION

The above-described problems are addressed and a technical solution is achieved in the art by providing a computer implemented method for determining a vehicle type of a vehicle detected in an image, comprising the steps of: receiving an image comprising a detected vehicle; projecting a plurality of vehicle models comprising salient feature locations on the detected vehicle, wherein each vehicle model is associated with a vehicle type; comparing a first set of features derived from each of the salient feature locations of the vehicle models to a second set of features derived from corresponding salient feature locations of the detected vehicle to form a plurality of positive match scores (p-scores) and a plurality of negative match scores (n-scores); and classifying the detected vehicle as one of the plurality of vehicle models based at least in part on the plurality of p-scores and the plurality of n-scores. One or more of the salient feature locations are located at a corner or a junction of the vehicle model.

According to an embodiment of the present invention, the descriptors are histogram of oriented gradients (HoG) feature descriptors. The step of comparing further comprises the step of matching HoG features of salient feature locations obtained from a vehicle model type and corresponding salient feature locations on the detected vehicle in the image. The step of matching further comprises the step of measuring a distance between an HoG feature of a salient feature location obtained from a one vehicle model type and corresponding salient feature location of the detected vehicle in the image. The distance measure used is a Euclidean distance between two HoG features. The step of matching HoG features is repeated for a remainder of the vehicle model types to form a salient feature distribution matrix (SMD).

According to an embodiment of the present invention, a p-score is a measure of similarity between a projected vehicle model and the detected vehicle in the image, which may be derived from the SMD. A p-score is a weighted mean of distances in a row of the SMD.

According to an embodiment of the present invention, an n-score is a measure of patterns of mismatch between rendered appearance of vehicle models and the appearance of the detected vehicle in the image. n-scores may be derived by performing a model-to-model match study in which patterns of inter-model differences are learned to form a plurality of model-to-model mismatch distributions. An n-score is formed for each of the plurality of vehicle model types based on an RMS distance between model-to-model mismatch distributions and a canonical distribution of mismatches derived from the SMD.

According to an embodiment of the present invention, classifying the detected vehicle further comprises the steps of: forming an N dimensional feature vector of n-scores and p-scores, wherein N is a size of the predetermined plurality of vehicle models; training an N/2 set of specific vehicle-type SVM classifiers; comparing the detected vehicle to each of the N/2 trained classifiers; and associating the detected vehicle with a trained classifier which produces the highest confidence value.

The above-described problems are addressed and a technical solution is achieved in the art by providing a computer implemented method for detecting a presence and location of a vehicle part in at least one image, comprising the steps of: training a multi-class classifier based on a plurality of predetermined landmarks corresponding to portions of a plurality of images of vehicle models in a plurality of canonical poses; selecting a region of interest (ROI) in the at least one image; for each pixel in the ROI, computing a set of descriptors corresponding to at least one image scale; processing each of the set of descriptors with the multi-class classifier to obtain a plurality of likelihood scores; summing the plurality of likelihood scores to produce a set of likelihood image maps each containing a probability value for having a particular vehicle part at a particular pixel location in the ROI; and determining a particular vehicle part is located at a particular pixel location of the ROI if the probability value associated with a likelihood image map is greater than or equal to a threshold value.

According to an embodiment of the present invention, the multiclass classifier may be a random forest of a plurality of random tree classifiers. Each of the random tree classifiers may be a binary support vector machine (SVM).

According to an embodiment of the present invention, for each landmark and for each canonical pose, positive samples of landmark regions and negative samples surrounding the landmark regions are collected to form positive and negative feature vectors, respectively. The positive and negative feature vectors are used to train the multi-class classifier. The negative feature vectors may further include background negative samples of random images that do not contain vehicles. Each of the set of descriptors may be a HoG descriptor.

The above-described problems are addressed and a technical solution is achieved in the art by providing a computer implemented method for determining a pose of a vehicle detected in at least one image, comprising the steps of: selecting a plurality of landmarks corresponding to a plurality of images of vehicle models in a plurality of canonical poses; for each canonical pose: sampling random configurations of vehicle parts, applying vehicle parts relationship constraints to the random configuration of vehicle parts, and fitting a two-dimensional (2D) deformable model of a vehicle to the random and constrained configuration of parts; computing a plurality of poses of the vehicle based on a plurality of likelihood scores obtained from the fitted 2D deformable model; and selecting a pose of the vehicle corresponding to a highest likelihood score. The plurality of likelihood scores may be computed using Oriented Chamfer distances between the fitted model and edges in the at least one image.

BRIEF DESCRIPTION OF THE DRAWINGS

The present invention will be more readily understood from the detailed description of exemplary embodiments presented below considered in conjunction with the attached drawings in which like reference numerals refer to similar elements and in which.

It is to be understood that the attached drawings are for purposes of illustrating the concepts of the invention and may not be to scale.

DETAILED DESCRIPTION OF THE INVENTION

Embodiments of the present invention employ an exemplary 3D method and system for real-time or near-real-time automatic, unattended detection and classification of types of vehicle models in aerial imagery.

The term "computer" or "computer platform" is intended to include any data processing device, such as a desktop computer, a laptop computer, a mainframe computer, a server, a handheld device, a digital signal processor (DSP), an embedded processor (an example of which is described in connection with FIG. 2 hereinbelow), or any other device able to process data. The term "communicatively connected" is intended to include any type of connection, whether wired or wireless, in which data may be communicated. The term "communicatively connected" is intended to include, but not limited to, a connection between devices and/or programs within a single computer or between devices and/or separate computers over a network. The term "network" is intended to include, but not limited to, OTA (over-the-air transmission, ATSC, DVB-T), video over packet-switched networks (TCP/IP, e.g., the Internet), satellite (microwave, MPEG transport stream or IP), direct broadcast satellite, analog cable transmission systems (RF), digital video transmission systems (ATSC, HD-SDI, HDMI, DVI, VGA), etc.

Figure 1A:
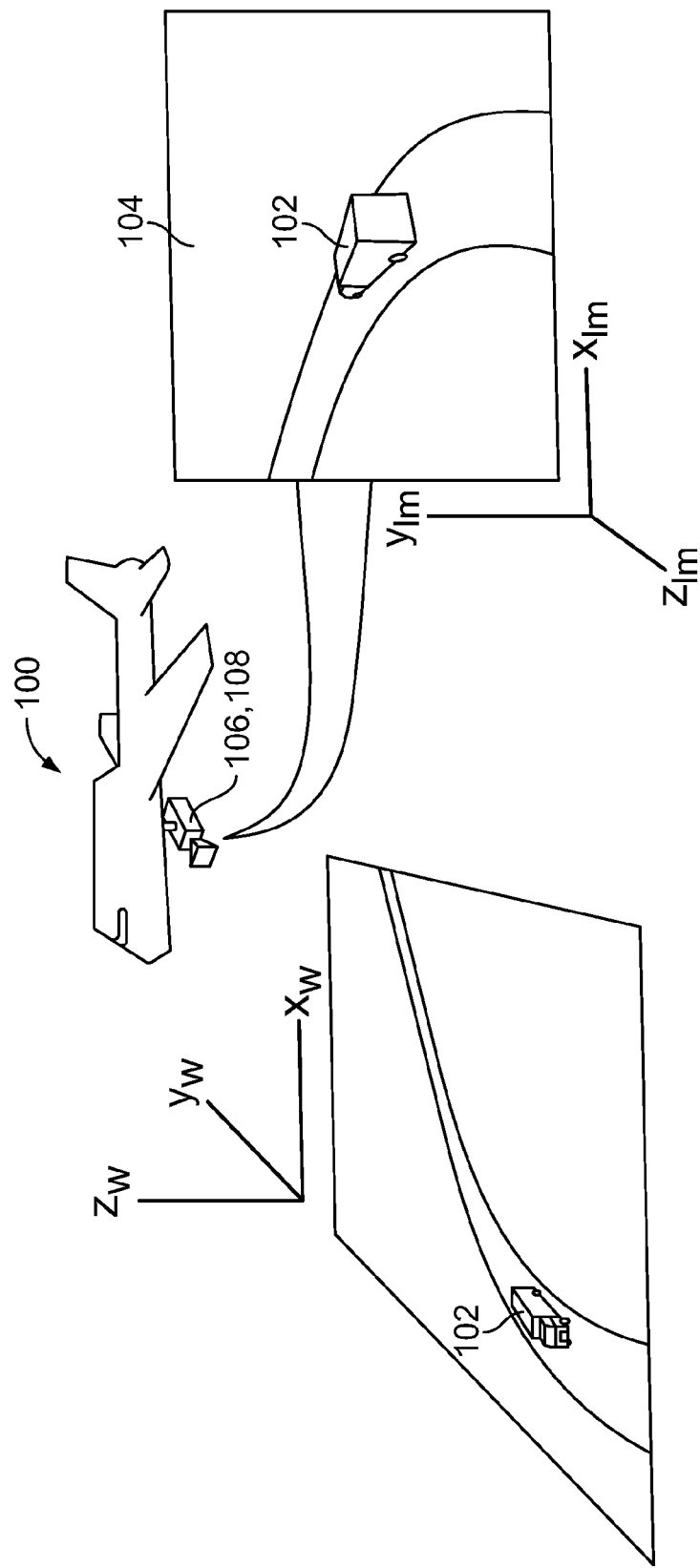
FIGS. 1A and 1B depict an exemplary unmanned aerial vehicle (UAV) configured to acquire a plurality of three-dimensional (3D) images of one or more vehicles in a scene, according to an embodiment of the present invention.
Figure 1B:
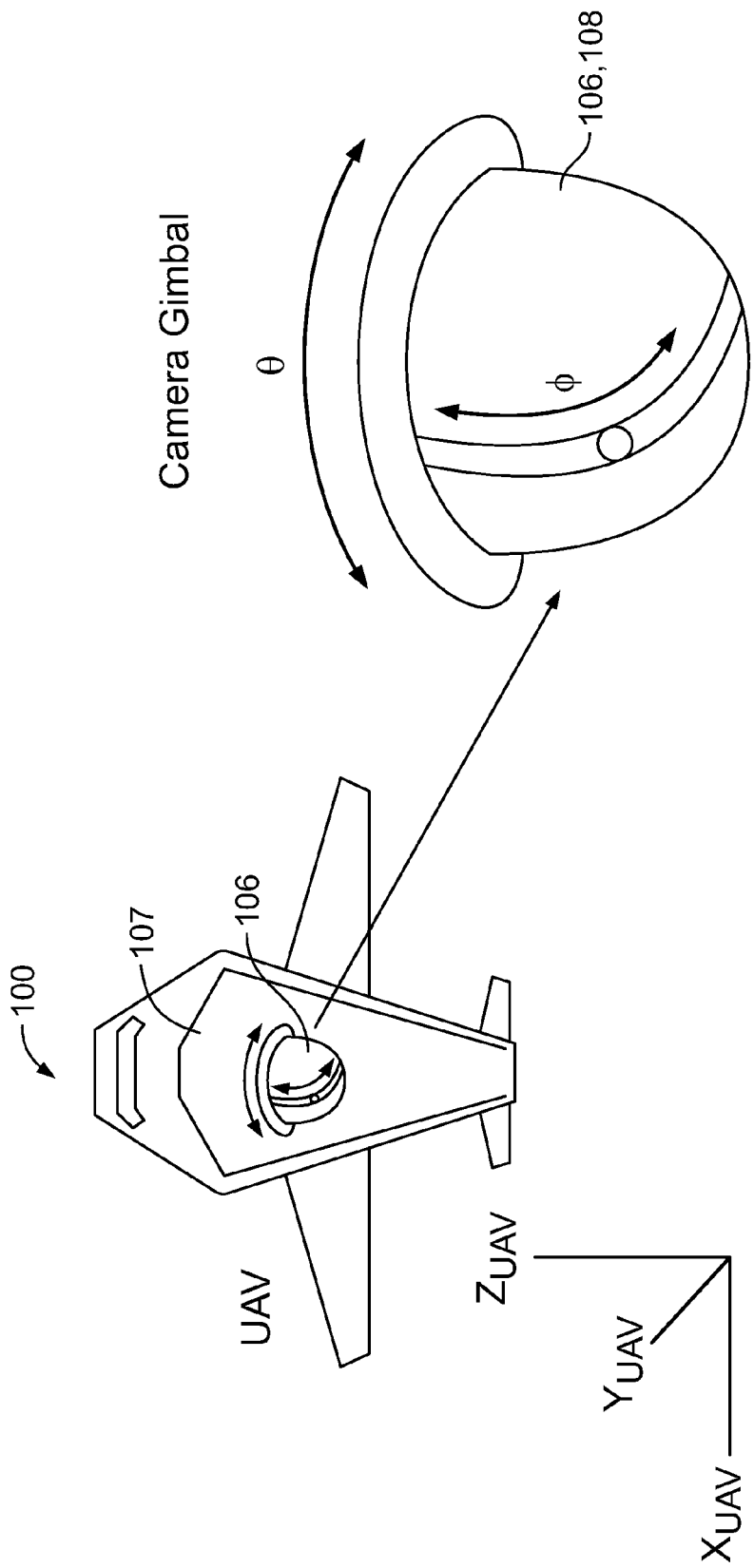

FIGS. 1A and 1B depict an exemplary unmanned aerial vehicle (UAV) 100 configured to acquire a plurality of three-dimensional (3D) images of one or more vehicles 102 in a scene 104, such a road, according to an embodiment of the present invention. The UAV 100 may include one or more suitable stereo (3D) image capturing devices 106 for capturing visual information (e.g., one or more still or video cameras, shape cameras, LIDAR or IR photogrammetry-generated range data) mounted on a rigid or semi-rigid areal platform 108. Suitable image capturing devices 106 may comprise, for example, 3D cameras with embedded transmission functions, camera transceiver systems, a video encoding appliance, a video statistical multiplexing appliance (statmux), computers with video capture cards, computers with attached cameras media servers that are spooling/streaming video files, PCs that are spooling/streaming video files, PCs, tablets, mobile phones, PDAs, video decoding appliances, video demultiplexing appliances, televisions, and television distribution devices (e.g., AppleTV™).

The UAV 100 may also include one or more suitable on-board sensors 110 for providing measurements of the altitude of the areal platform above ground, ground sampling distance (GSD), as well as rotation information (pose) of the at least one mage capturing device 106 may also be provided to align the coordinate system of the at least one image with the world frame of reference. These on-board sensors 110 are employed for assessing the geo-location of the UAV and the image capturing devices 106. As used herein, the term "geo-location" refers to the identification of a real-world geographic location of an object. Geo-location may refer to the practice of assessing the location, or to the actual assessed location.

Figure 2:
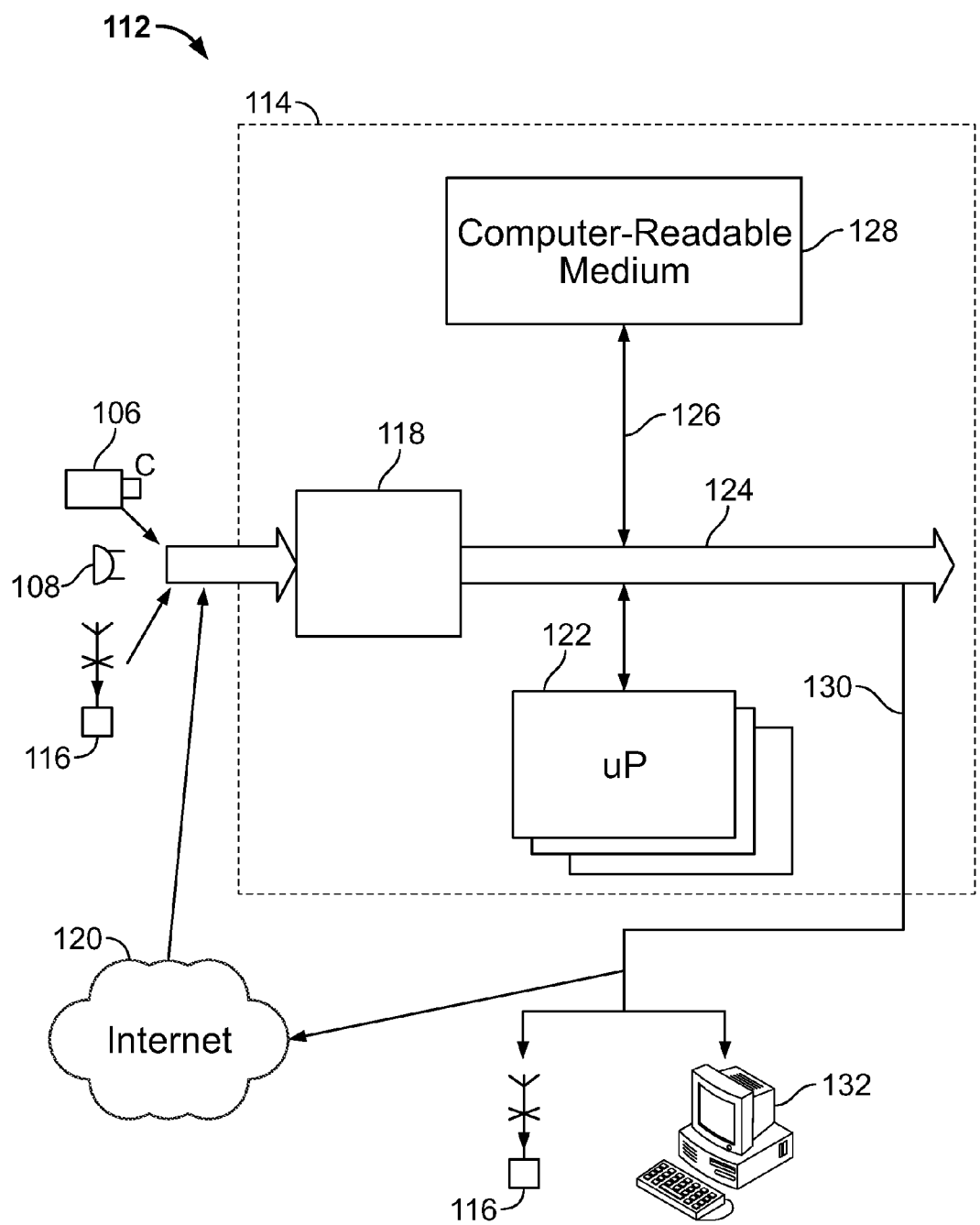
FIG. 2 is a hardware block diagram of an exemplary digital processing system for detecting and classifying types of vehicle models in aerial imagery captured by the one or more image capturing devices associated with the UAV of FIGS. 1A and 1B, according to an embodiment of the present invention.

FIG. 2 is a hardware block diagram of an exemplary digital processing system 112 for detecting and classifying types of vehicle models in aerial imagery captured by one or more image capturing devices 106 associated with the UAV 100, according to an embodiment of the present invention. By way of a non-limiting example, the system 112 receives digitized video from one or more 3D image capturing devices 106 (e.g., cameras), which may be rigidly mounted on the aerial platform 107. The system may include a plurality of on-board sensors 108 described hereinabove. The system 112 may include an on-board computing platform 114, or the computer platform 114 may be located on the ground to which images and telemetry received by the on-board sensors 108 may be transmitted by a radio transmitter 116. The system 110 may optionally include a digital video capture system 118. The digital video capturing system 118 processes streams of digital video, or converts analog video to digital video, to a form which can be processed by the computing platform 114. Optionally, the digitized video or still images may be received from a network 120, such as the Internet. The digital video capturing system 118 may be stand-alone hardware, or cards such as Firewire cards which can plug-in directly to the computing platform 114. The computing platform 114 may include one or more embedded controllers, a personal computer, or a work-station (e.g., a Pentium-M 1.8 GHz PC-104 or higher) comprising one or more processors 122 which includes a bus system 124 which is fed by a video/audio data streams 126 via the one or more processors 122 or directly to a computer-readable medium 128. Alternatively, the computing platform 114 may be implemented as or part of an integrated circuit, such as a graphics processing unit (GPU) or digital signal processor (DSP) implemented in an FPGA or ASIC.

The computer readable medium 128 may also be used for storing the instructions of the system 112 to be executed by the one or more processors 122, including an optional operating system, such as the Windows or the Linux operating system. The computer readable medium 128 may further be used for the storing and retrieval of processed video and/or of the present invention in one or more databases. The computer readable medium 128 may include a combination of volatile memory, such as RAM memory, and non-volatile memory, such as flash memory, optical disk(s), and/or hard disk(s). Portions of a processed video/audio data stream 130 may be stored temporarily in the computer readable medium 128 for later output to for later output to a monitor 132 on the ground via the a radio transmitter 116 and optionally, the network 120, such as the Internet. The monitor 132 can display a processed video data stream which identifies vehicles and vehicle types.

Figure 3A:
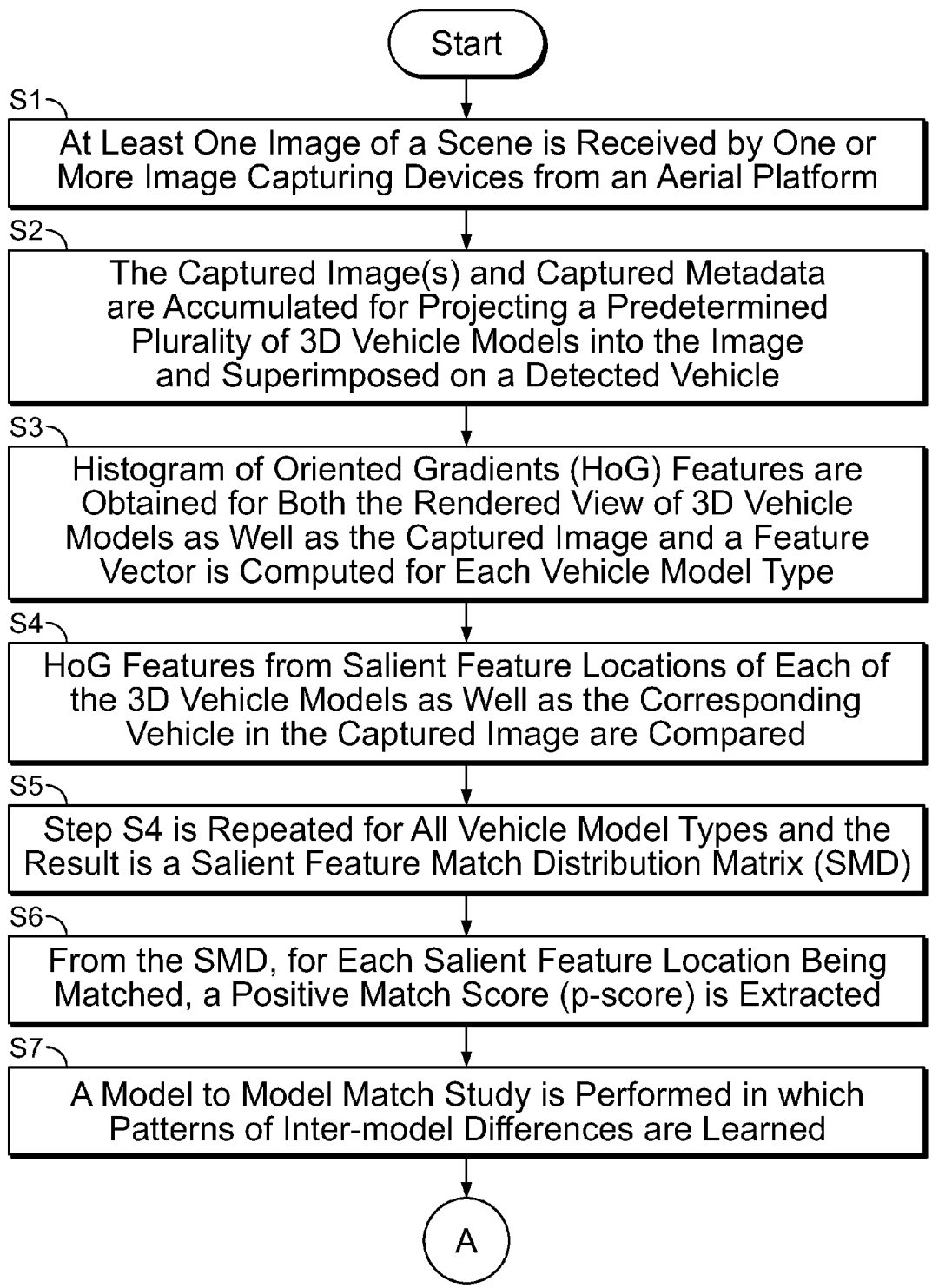
FIGS. 3A and 3B comprise a process flow diagram illustrating exemplary steps of a method for distinguishing between types of vehicle models in aerial imagery, according to an embodiment of the present invention.
Figure 3B:
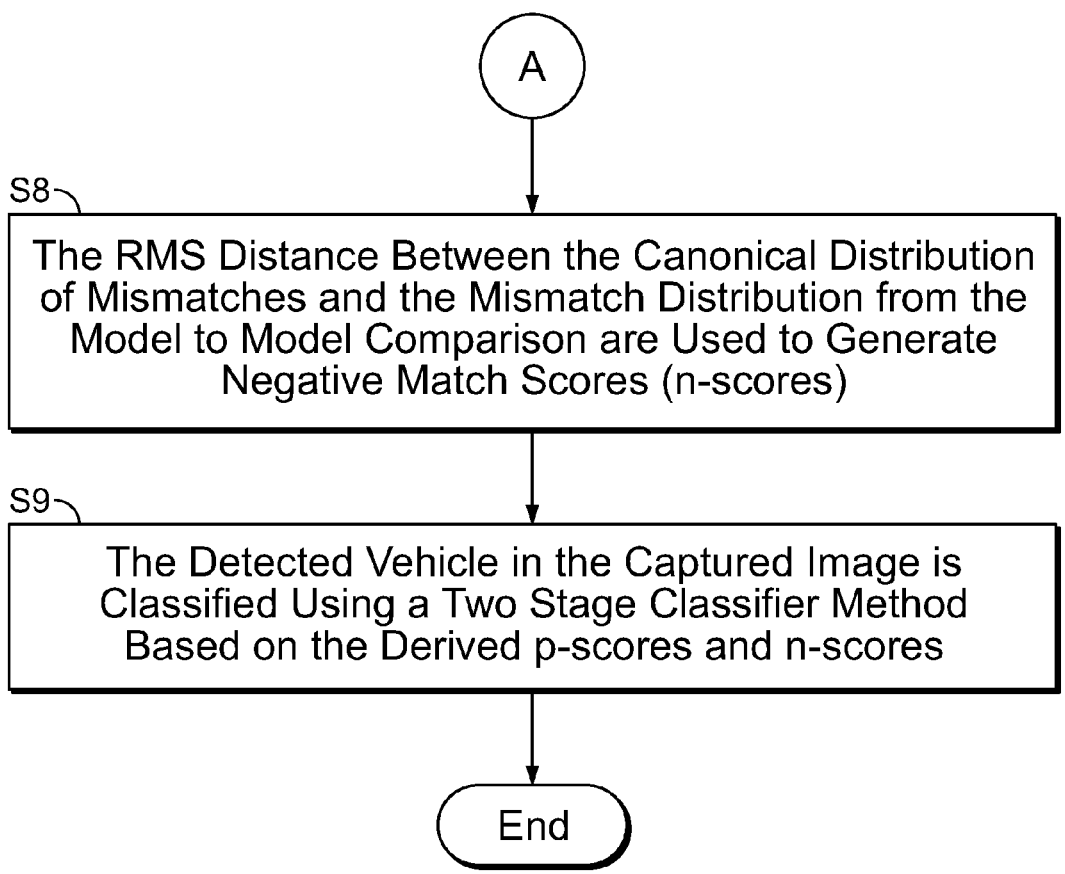

FIGS. 3A and 3B depict a process flow diagram illustrating exemplary steps of a method for distinguishing between types of vehicle models in aerial imagery, according to an embodiment of the present invention. Referring now to FIGS. 1A-3B, in step S1, at least one image of the scene is received by one or more image capturing devices 106 from the aerial platform 107. Time synchronized metadata is also provided by the plurality of on-board sensors 108 described hereinabove. The current geo-location of the areal platform, the altitude of the areal platform above ground, ground sampling distance (GSD), as well as rotation information (pose) of the at least one image capturing device 106 may also be provided to align the coordinate system of the at least one image with the world frame of reference.

Figure 4A:
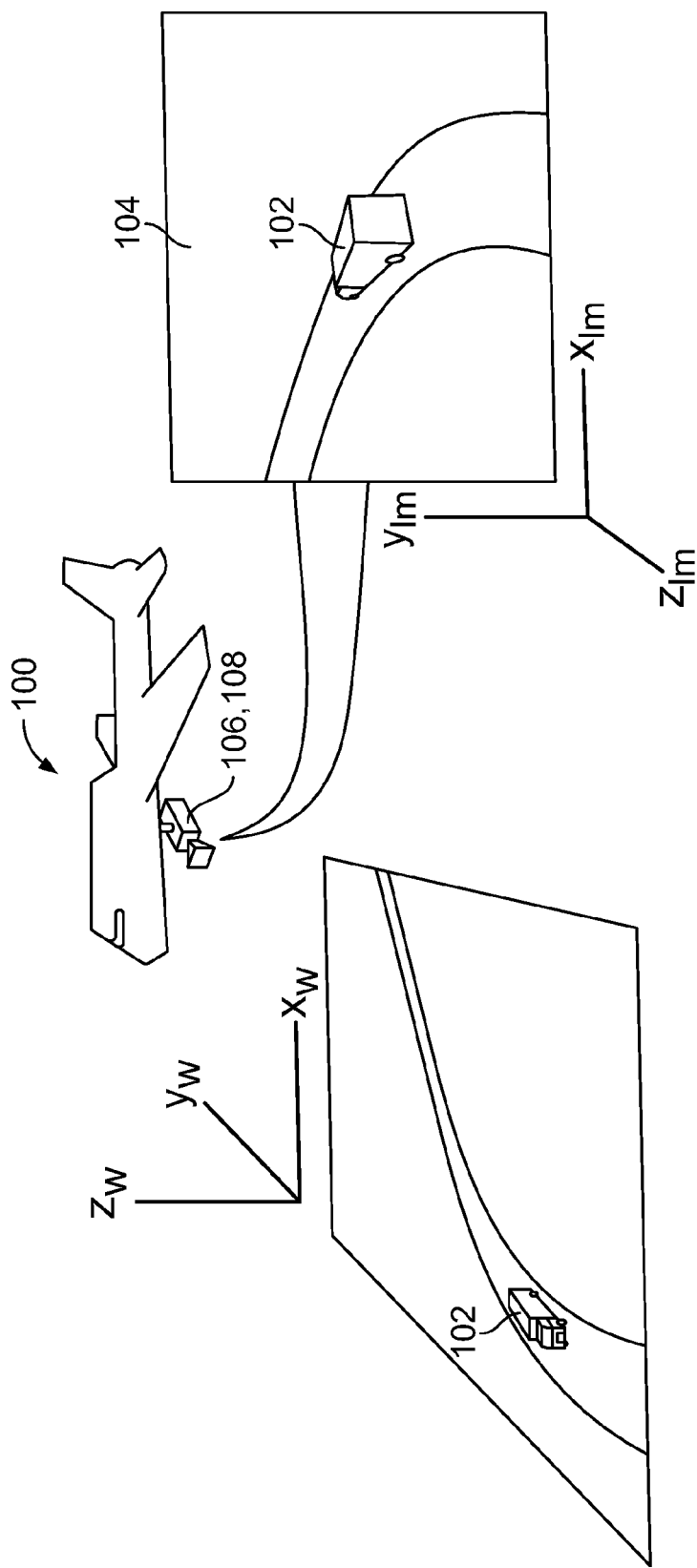
FIGS. 4A-4D visually depict one method for obtaining a pose of at least one image capturing device, according to an embodiment of the present invention.
Figure 4B:
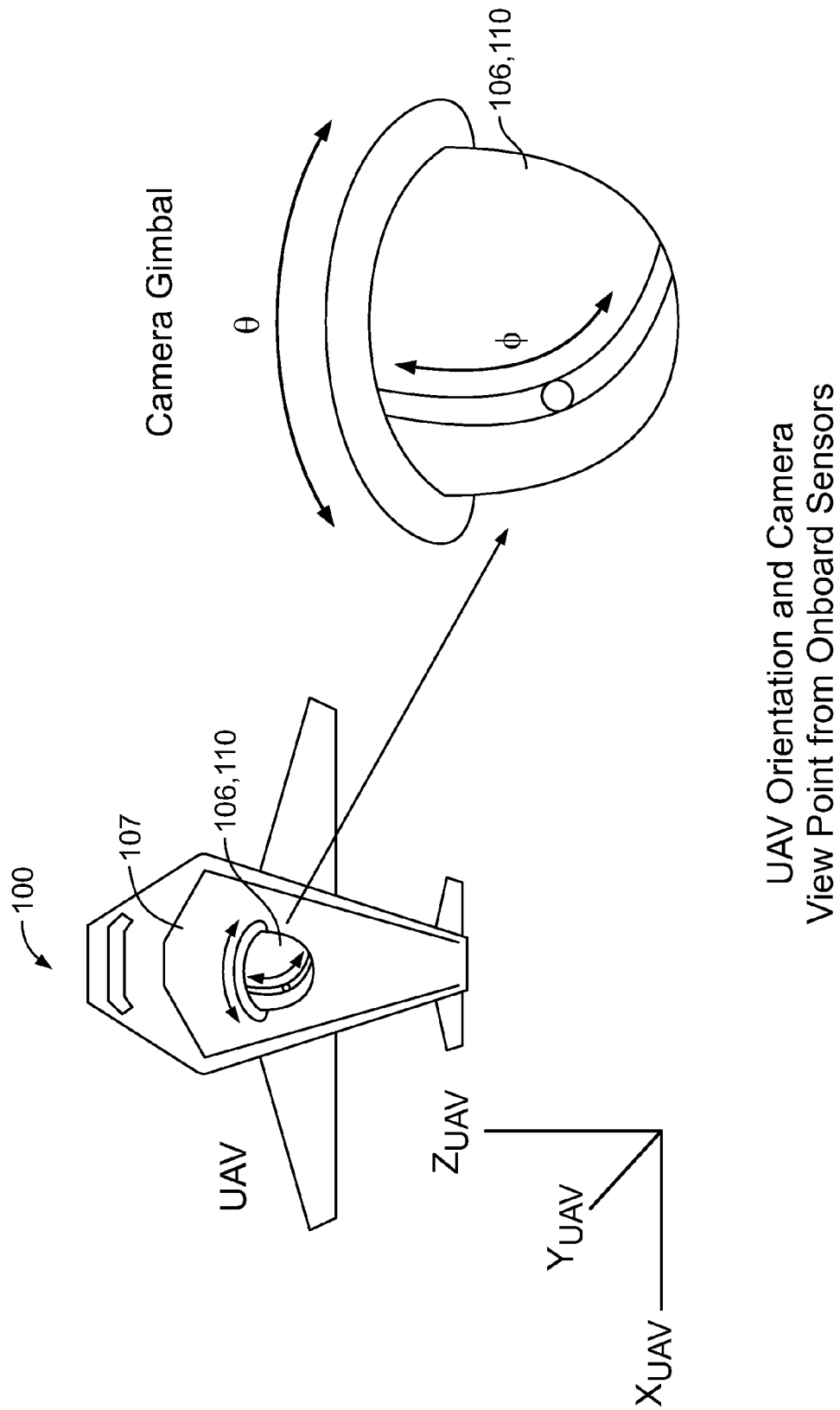
Figure 4C:
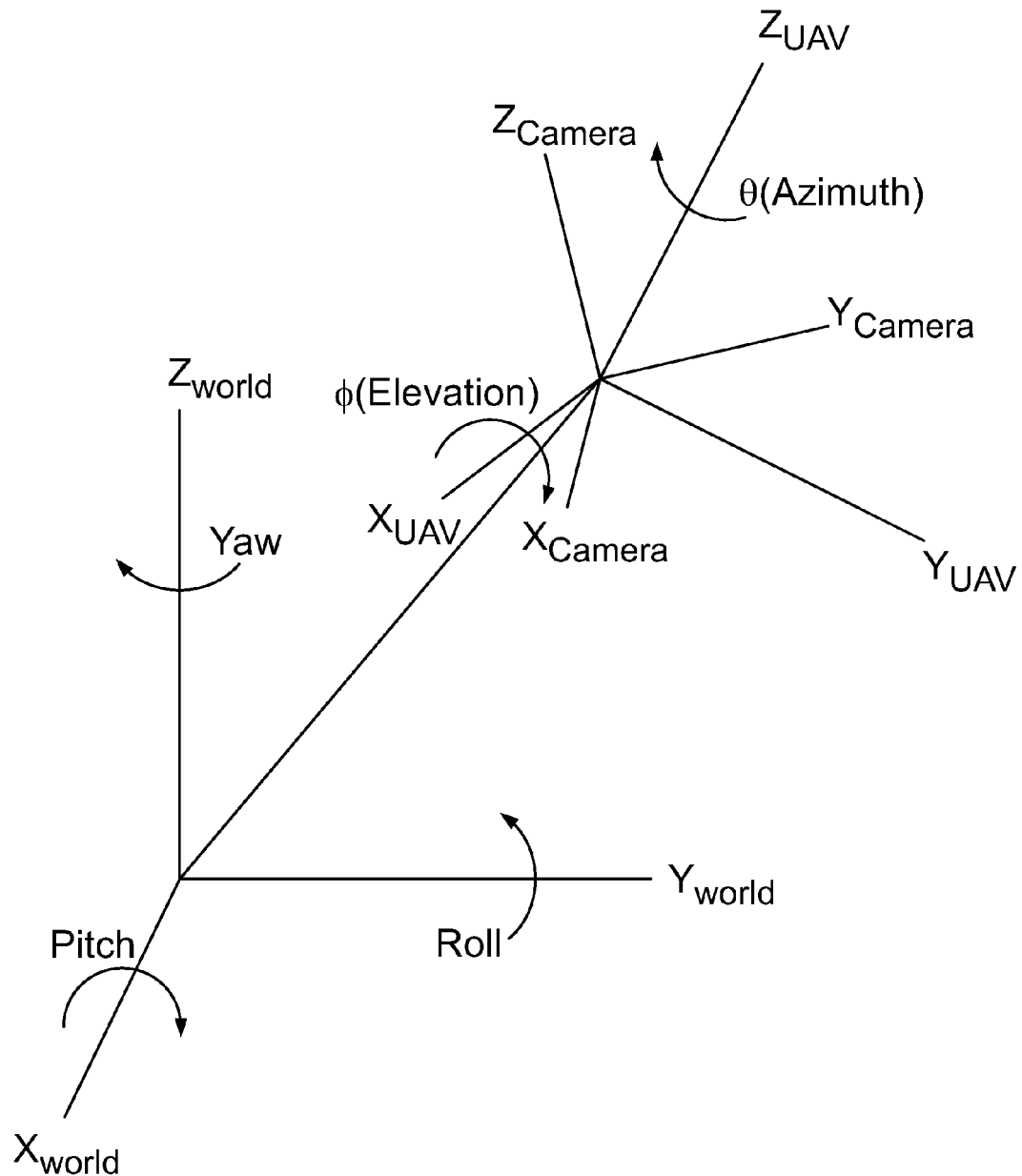
Figure 4D:
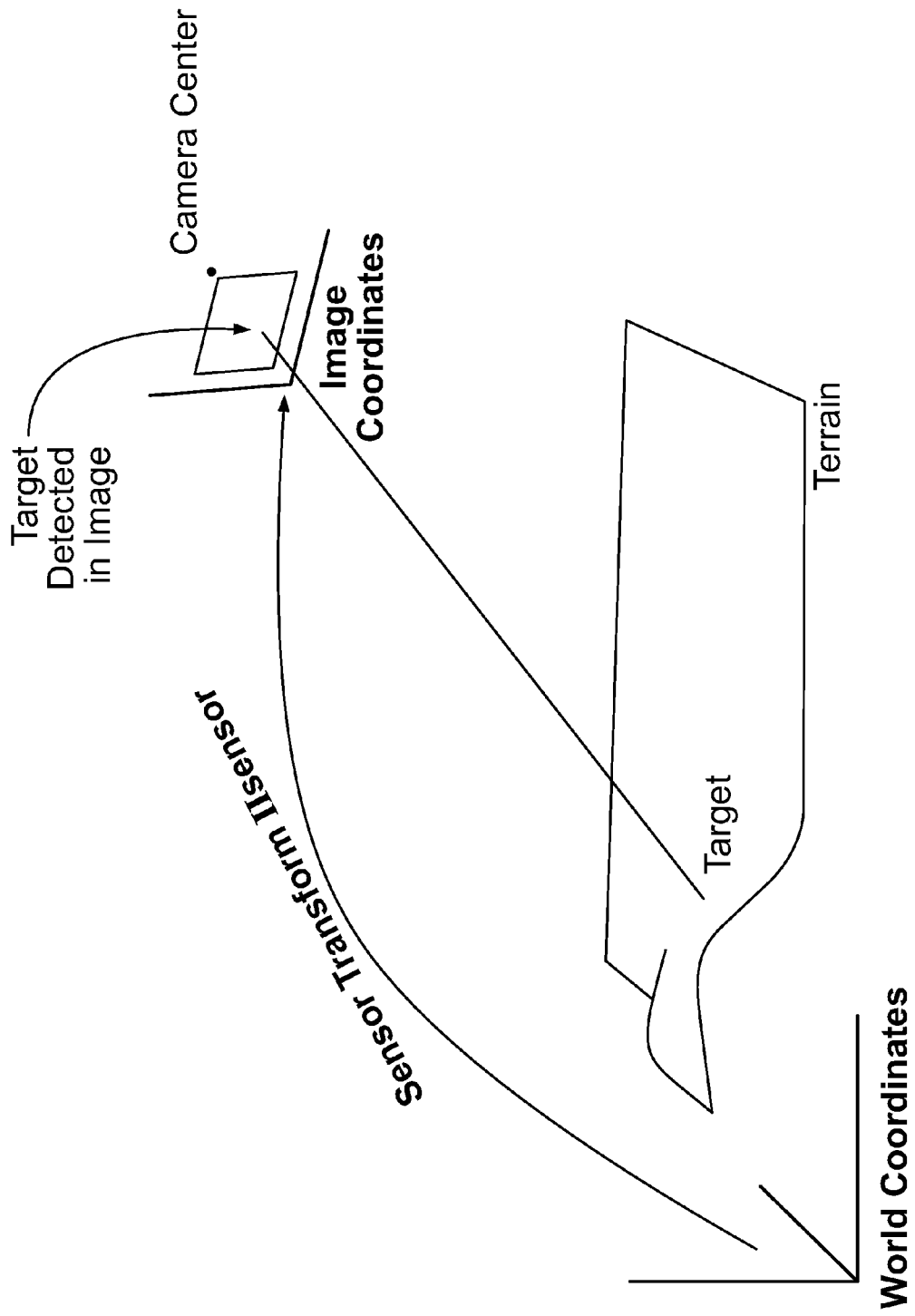

FIGS. 4A-4D visually depict one method for obtaining a pose of an image capturing device 106. In FIG. 4A, one or more images of a scene that may contain a vehicle to be classified are obtained by the image capturing device 106 located on the UAV platform 107. In FIG. 4B, an orientation and camera viewpoint of the UAV 100 are obtained from the on-board sensors 108. In FIG. 4C, a sensor-to-world projection model for each of the on-board sensors 108 is obtained using the computer platform 114. In FIG. 4D, a world-to-image transformation is obtained to be described hereinbelow in connection with FIG. 5.

Figure 5:
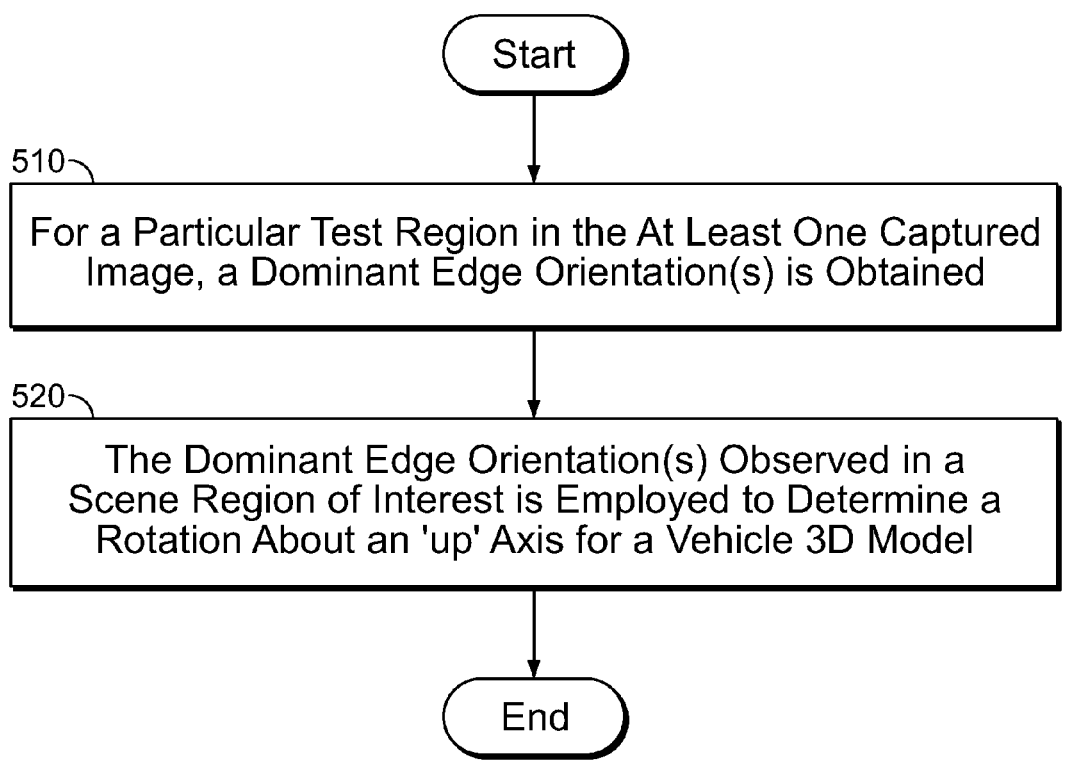
FIG. 5 shows exemplary steps for employing metadata to determine a world-to-image transformation.

FIG. 5 shows exemplary steps for employing metadata to determine a world-to image-transformation. In step 510, for a particular test region in the at least one captured image, a dominant edge orientation is obtained. A person skilled in the art would appreciate that vehicles observed in aerial imagery may have a concentration of edges distributed along the length of the vehicle and a direction perpendicular to it. In step 520, the dominant edge orientation(s) observed in a scene region of interest may be employed to determine a rotation about an 'up' axis for a vehicle 3D model (i.e., the pose of the image capturing device 106).

Returning now to FIGS. 3A and 3B, in step S2, the captured image(s) and the captured metadata are accumulated for projecting a predetermined plurality of 3D vehicle models into the image(s) and superimposed on a detected vehicle with an appropriate scale and in a correct pose with respect to the azimuth and elevation of the image capturing device 106. Any suitable method may be used for detecting the presence, location, and pose of a vehicle in the captured image, but a preferred method will be described hereinbelow in connection with FIGS. 12-14. The method described in connection with FIGS. 3A and 3B is primarily concerned with classifying a detected vehicle into one of a plurality of vehicle models. The predetermined set of 3D vehicle models $V=\{V_1, V_2, \ldots, V_n\}$ is empirically selected to span a representative space of vehicle models in a domain of vehicle models. Each vehicle model is a detailed 3D mesh of a specific vehicle body type, e.g., mid sedan, SUV, etc. A representative, but non-limiting set of vehicle types may include: full sedan, mid sedan, compact sedan, station wagon, van, SUV, compact/crossover SUV, and truck.

Figure 6:
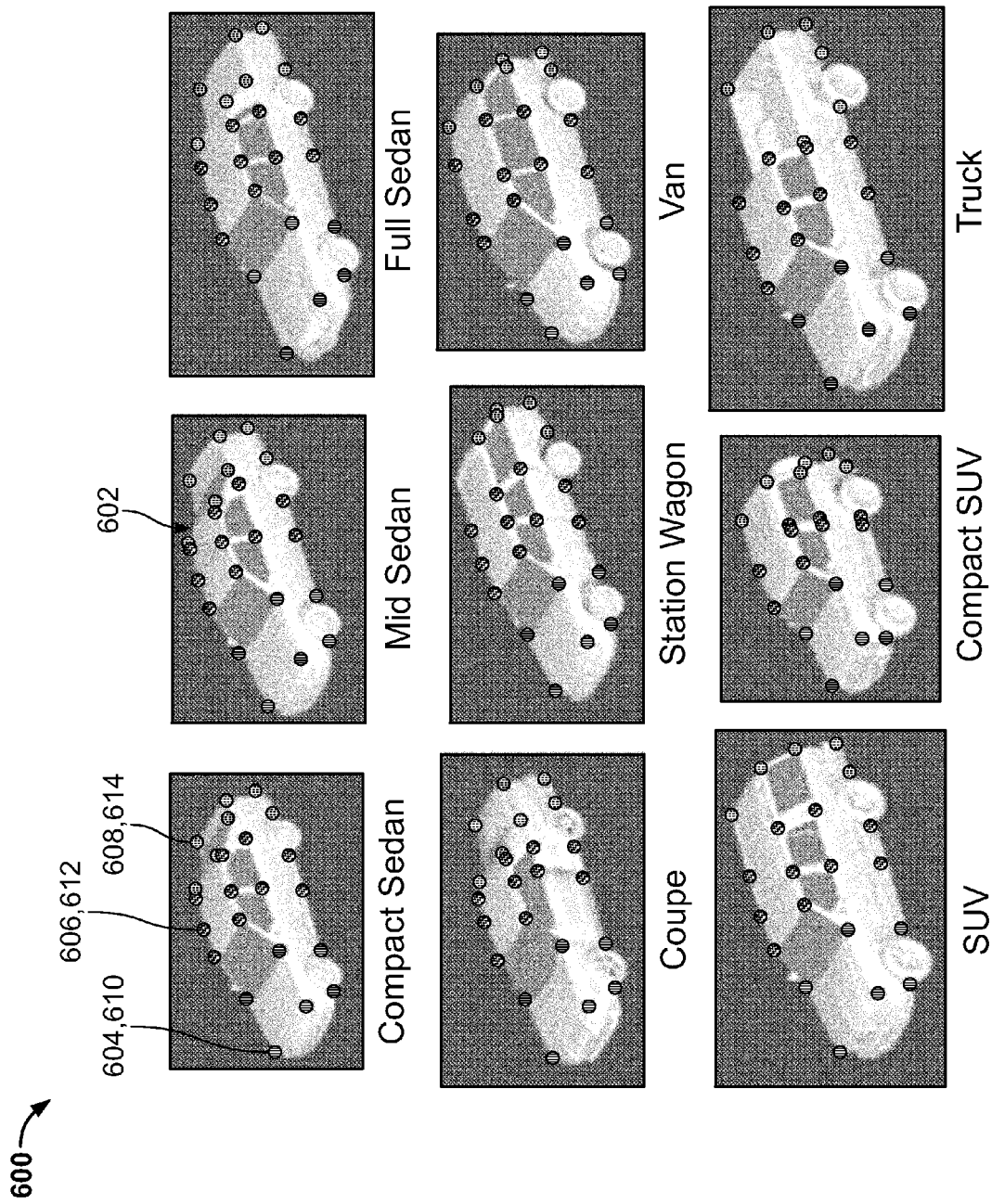
FIG. 6 shows views of a representative collection of images of nine predetermined vehicle models.
Figure 7:
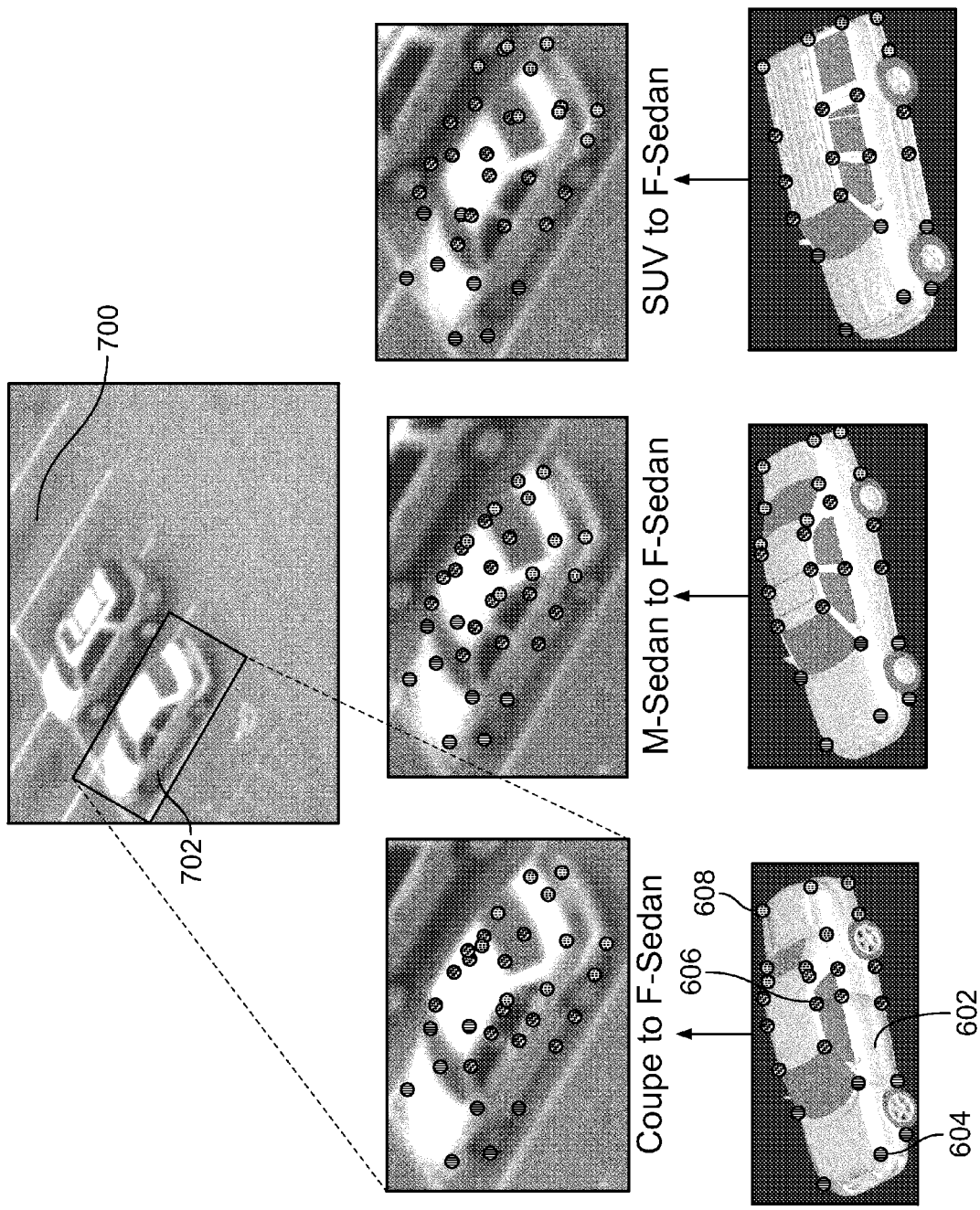
FIG. 7 visually depicts the projections of predetermined salient locations of each of the vehicle models of FIG. 6 into a captured image proximal to a detected vehicle.
Figure 8:
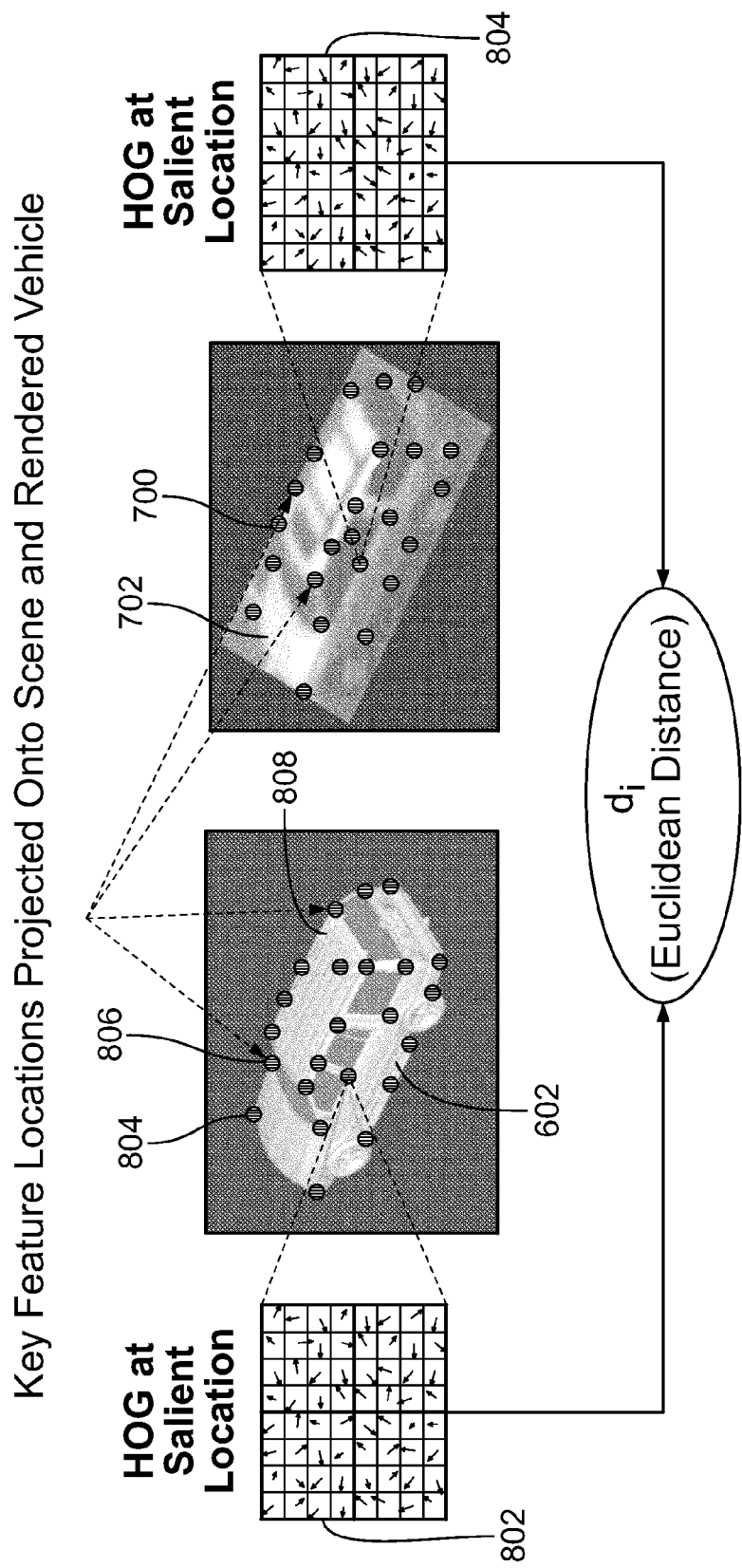
FIG. 8 visually depicts obtaining Histogram of Oriented Gradients (HoG) feature descriptors for both the rendered view of the 3D vehicle models of FIG. 6 as well as the captured image of FIG. 7.

FIG. 6 shows views of a representative collection of images 600 of nine predetermined vehicle models 602. Salient locations 604, 606, 608 located about the front, middle, and back sections of the vehicle models 602 are marked in the images 600 of each vehicle model, respectively. The set of key/salient locations 604, 606, 608 capture the unique surface curvatures and spatial orderings of a vehicle model 602. These salient locations 604, 606, 608 have been empirically determined to represent the most distinguishing shape and appearance features of a vehicle model 602, thus permitting an identification of fine distinctions among vehicle model types. For instance, the contours of a sedan and a coupe are quite similar. By choosing appearance features based on salient locations such as corners of doors, a powerful criteria for distinguishing between sedans and coupes is obtained, since sedans and coupes have substantially differently shaped doors.

The salient locations 604, 606, 608 may be marked either a-priori by a user or obtained automatically using either mesh segmentation methods, such as the methods described in an article by M. Attene, B. Falcidieno, and M. Spagnuolo, titled "*Hierarchical mesh segmentation based on fitting primitives,*" in The Visual Computer 22(3): 181-193, 2006, or an analysis of maximas/minimas in the surface curvature as described in an article by K. Watanabe and A. Belyaev, titled "*Detection of salient curvature features on polygonal surfaces,*" in Proceedings of Eurographics, 2001.

A non-limiting example of a method for manually choosing the salient locations 604, 606, 608 from 3D vehicle model 602 may be described herein as follows. As described hereinabove, each 3D vehicle model 602 may be divided into three distinct portions: front 610, middle 612, and back 614. A total of 32 empirically selected salient locations are specified for each model. These are distributed as 8 features in the front 610, 14 in the middle 612, and 10 in the back 614 of each of the vehicle models 602. Texture-less regions are preferably avoided, such as the center of the hood or roof. Instead, the salient locations 604, 606, 608 are chosen to be located at corners and junctions of a vehicle models 602, which are a rich source of edge distribution and gradient information. A person skilled in the art would appreciate that salient locations across vehicle models tend to be semantically related. For example, the four corners of a hood are consistently selected across the vehicle models 602. This correspondence across the vehicle models 602 permits an analysis of salient locations that have a greater impact in differentiating various vehicle models 602.

Referring now to FIGS. 3A, 3B, 6, and 7, for each vehicle 3D vehicle model 602, the predetermined salient locations 604, 606, 608 of each of the vehicle models 602 are projected into the captured image 700 proximal to a detected vehicle 702 as a first step in matching at least one of the vehicle models 602 to the detected vehicle 702 in the captured image 700.

In step S3, and referring to FIGS. 3A, 3B, 6, 7, and 8, for each of the salient feature locations 604, 606, 608, Histogram of Oriented Gradients (HoG) features 802, 804 are obtained for both the rendered view of the 3D vehicle models 602 as well as the captured image 700, respectively. The HoG features 802, 804 are formed into feature vectors. These feature vectors are then matched as described hereinbelow in connections with steps S4-S9 and FIGS. 9, and 10. A person skilled in the art would appreciate that, since locations 804, 806, 808 of corresponding salient features of the detected vehicle 702 in the captured image 700 are known, then with the correct vehicle model and image pose of the image capturing device 106, the salient feature locations 804, 806, 808 of corresponding salient features of the vehicle 702 in the captured image 700 will match the corresponding salient feature locations 604, 606, 608 of at least one of the vehicle models 602 and an appropriate classification may be obtained.

For each of the salient feature locations 804, 806, 808, a neighborhood (a square region centered at a salient feature location) is defined with which a 2D descriptor based on an HoG feature extraction method, such as the one describe in an article by N. Dalal and B. Triggs, titled "*Histograms of oriented gradients for human detection,*" in IEEE Computer Vision and Pattern Recognition, 2005, is computed. In a preferred embodiment, a fast HoG implementation as described in an article by Q. Zhu, S. Avidan, M. C. Yeh, and K. T. Cheng, titled "*Fast human detection using a cascade of histograms of oriented gradients,*" in IEEE Computer Vision and Pattern Recognition, 2006, may be employed. After quantizing the gradient orientation at each pixel, an integral image for each discrete orientation is computed and stored. These integral images are used to compute the HoG for any rectangular image region. In a preferred embodiment, a 3×3 cell descriptor block is used, each having a pixel size of 5×5. For each cell in the block, a feature vector $h_{ij}$ is computed, where $(i, j) \in \{1,2,3\}^2$, by quantizing the unsigned orientation into K orientation bins weighted by the gradient magnitude as defined by Equation 1:

$$h_{ij} = [h_{ij}(\beta)]_{\beta \in [1 \ldots K]}^T \quad (1)$$

where $h_{ij}(\beta)$ is defined as:

$$h_{ij}(\beta) = g(u,v)\delta[\text{bin}(u,v) - \beta] \quad (2)$$

The functions g(u,v) and bin(u,v) return the gradient at pixel (u, v) and index of the orientation bin associated with it; δ is the Kronecker delta. The 2D descriptor of the block is a vector concatenating the feature vectors of all its cells normalized by the coefficient α defined as:

$$\alpha = \sum_{i=1}^{3} \sum_{j=1}^{3} \sum_{\beta=1}^{K} h_{ij}(\beta) \quad (3)$$

In empirical experiments, the influence of the number of discrete HoG orientations was evaluated. Several configurations were employed wherein the number of bins varied from 8 to 32 with signed or unsigned orientations. Using signed orientations appeared to produce better results, 16 bins outperformed 8 bins (by 3%) and 32 bins lead to the same performance as 16 bins.

In step S4, and referring to FIGS. 3A and 3B, 6, 7, 8, and 9, HoG features 802, 804 from salient feature locations 604, 606, 608 in the rendered view of each of the 3D vehicle models 602 as well as the salient feature locations 804, 806, 808 of the corresponding the vehicle 702 in the captured image 700 are compared (i.e., by Euclidean distance) and a 32 dimensional (corresponding to the number of salient locations) feature vector 904 is computed for each vehicle model type.

Figure 9:
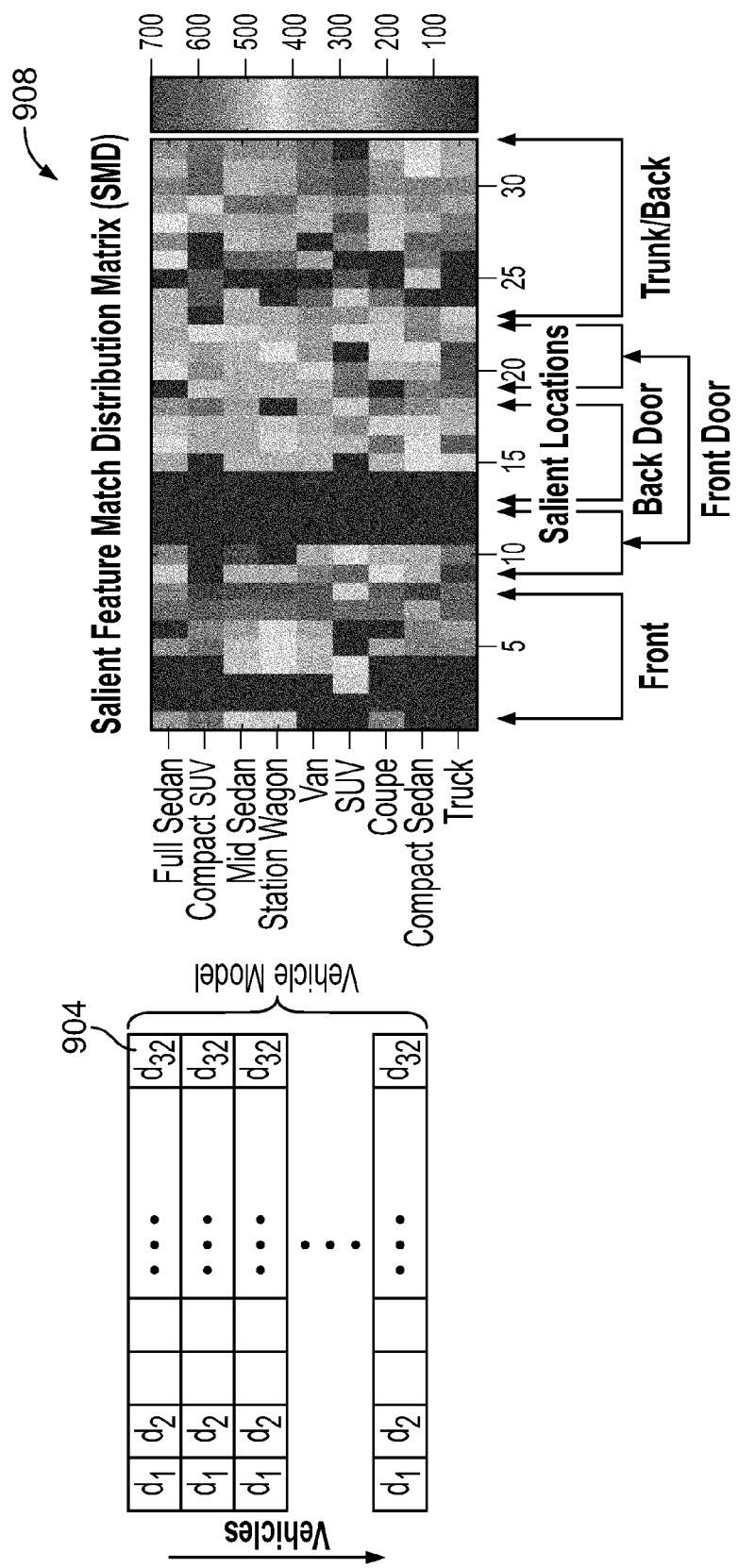
FIG. 9 visually depicts HoG features formed into a 32 dimensional feature vector that is used to create a salient feature match distribution matrix (SMD)

In step S5 and referring to FIG. 9, the process is repeated for all n vehicle model types and the result is a n×32 salient feature match distribution matrix (SMD) 908, where each row 910 corresponds to the match scores from matching a particular vehicle model. It should be noted that salient feature locations that are occluded are not considered in the HoG based feature matching step S6. To account for occlusions, occlusion reasoning may be performed using z-buffering while rendering the 3D vehicle models 602. As used herein, occlusion reasoning refers to a process of determining whether a particular salient feature location of a vehicle 3D model is visible from a particular viewpoint. For instance, when looking front-on, salient locations in the back of a vehicle will be occluded. Occlusion reasoning is used to ensure that salient locations that are occluded are not included in determining match scores. As used herein z-buffering is a technique used in computer graphics when rendering 3D scenes to determine which scene elements are in the line-of-sight of a camera. Essentially, for all scene elements in the line-of-sight of the camera, only the one with smallest Z value (depth/distance from camera center) is labeled as being visible to the camera (not occluded) and therefore rendered.

Each row of the SMD 908 corresponds to a particular 3D vehicle model 602 and contains the HoG match scores (between the captured image 700 and a 3D vehicle model 602) computed at the 32 salient feature locations from the individual one of the 3D vehicle models 602. For the purpose of illustration, the division of the salient feature locations 604, 606, 608 (front 610, middle 612, and back 614) are marked underneath the SMD 908. Smaller values represent a closer match.

In Step S6 and referring to FIGS. 3A, 3B, 6-9, and 10, from the SMD 908, for each salient feature location being matched, a positive match score 1002 is extracted. The positive match score or p-score 1002 is a measure of similarity between a rendered 3D vehicle model 602 and the detected vehicle 702 in the captured image 700. It is obtained by a weighted averaging of the salient locations feature obtained from a particular vehicle model type, i.e., the values in the corresponding row in the SMD from models to scene matching as described in Equation 4:

$$p_i = \sum_{j=1}^{32} M_s(i,j)/32, \quad (4)$$

or more generally as in Equation 4a:

$$p_i = \frac{\sum_{j=1}^{N} \delta(i,.j) M_s(i,j)}{\sum_{j=1}^{N} \delta(i,.j)}, \quad (4a)$$

where $M_s$ is the SMD 1006 obtained from models to scene matching. The SMD 1006 is displayed with a color palette that depicts a smaller value (greater match) with a cooler hue. As with FIG. 9, and for the purpose of illustration, the division of salient feature locations 604, 606, 608 (front, middle, and back) are marked underneath the SMD 1006. Smaller values represent a closer match.

An impetus for employing a negative match score (or n-score) 1004 is the consistency in patterns of mismatch between rendered appearance of vehicle models 602 and the appearance of the detected vehicle 702 in the captured image 700. For example, if a detected vehicle 702 in the captured image 700 matches most closely to the 3D model $V_i$, then conversely, the detected vehicle 700 would differ from other vehicle models in V in a manner similar to how renderings of $V_i$ differ from renderings of other models.

In step S7, a model to model match study 1008 is performed in which patterns of inter-model differences are learned. Each of vehicle models 602 in V is rendered and matched with the rest of the vehicle models 602 in the same manner as a detected vehicle 702 in the captured image 700 is matched. The SMDs $\{M_v^1, \ldots M_v^n\}$ one for each of the n vehicle models represent model-to-model mismatch distributions 1010. It is proposed that the model mismatch distribution 1008 remains consistent when the 3D vehicle model 602 is replaced with the detected vehicle 702 in the captured image 700 and therefore may be used as an additional feature for recognition.

In the captured image SMD 908, $M_s$, each row corresponds to match scores from a specific vehicle model hypothesis and therefore the remaining rows of $M_s$ may be used as a canonical distribution of mismatches. In Step S8, the RMS distance between the canonical distribution of mismatches (i.e., a subset of $M_s$ not including the row containing the vehicle model hypothesis) and the mismatch distribution from the model-to-model comparison $\{M_v^1, \ldots M_v^n\}$ are used to generate a negative match score $n_i$ for each of the n vehicle hypotheses as shown in Equation 5:

$$n_i = \sqrt{\sum_{\substack{j \neq i \\ j \in [1:32]}} (M_s(j,k) - M_v^i(j,k))^2}. \quad (5)$$

Figure 10:
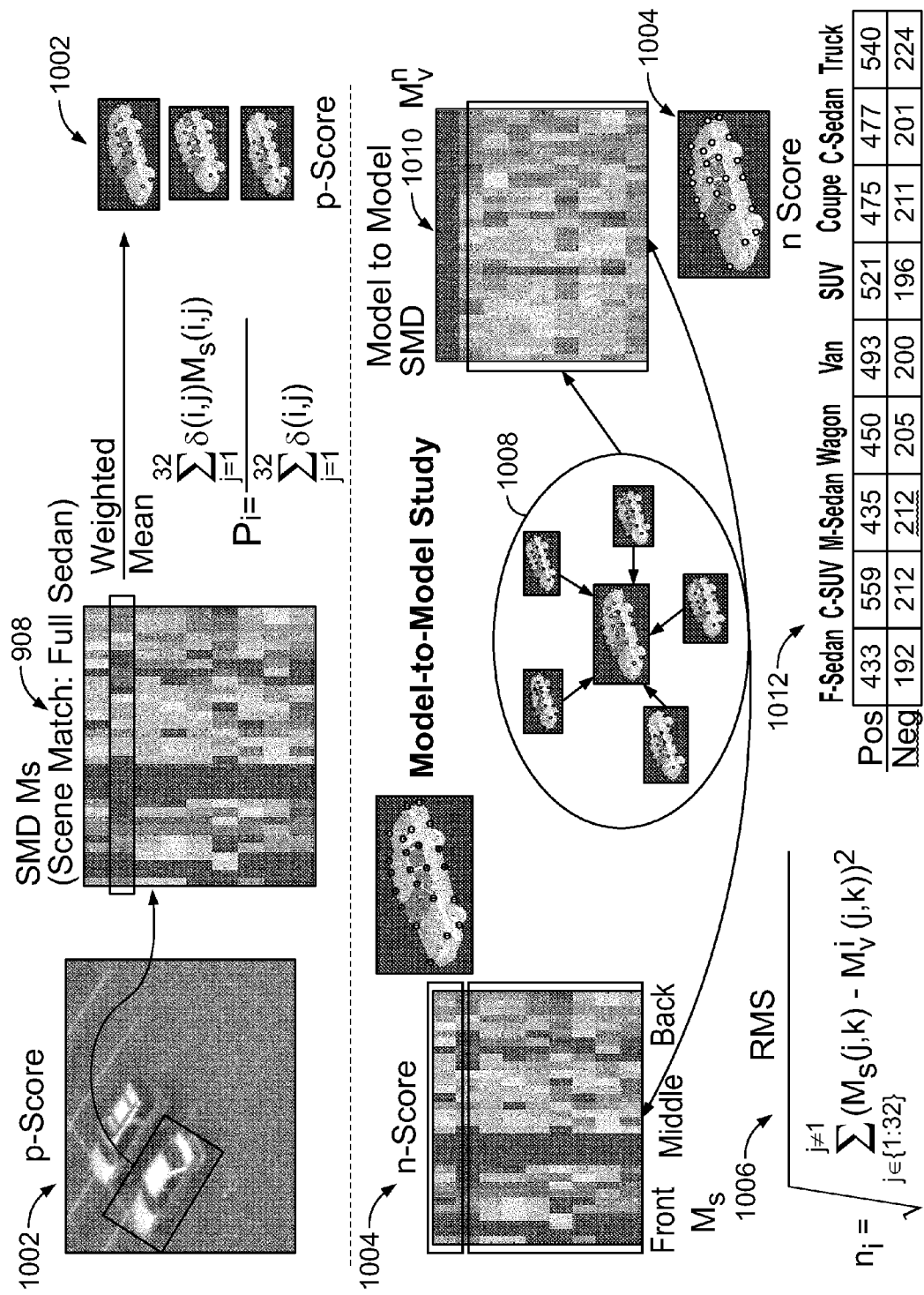
FIG. 10 visually depicts the calculation of p-scores and n-scores from the SMD of FIG. 9.

The n and p match scores are combined to obtain the labeling likelihood modeled as the exponent of the linear combination of the positive and negative match scores, as may be derived from the table 1012 of p-scores and n-scores of FIG. 10.

Figure 11:
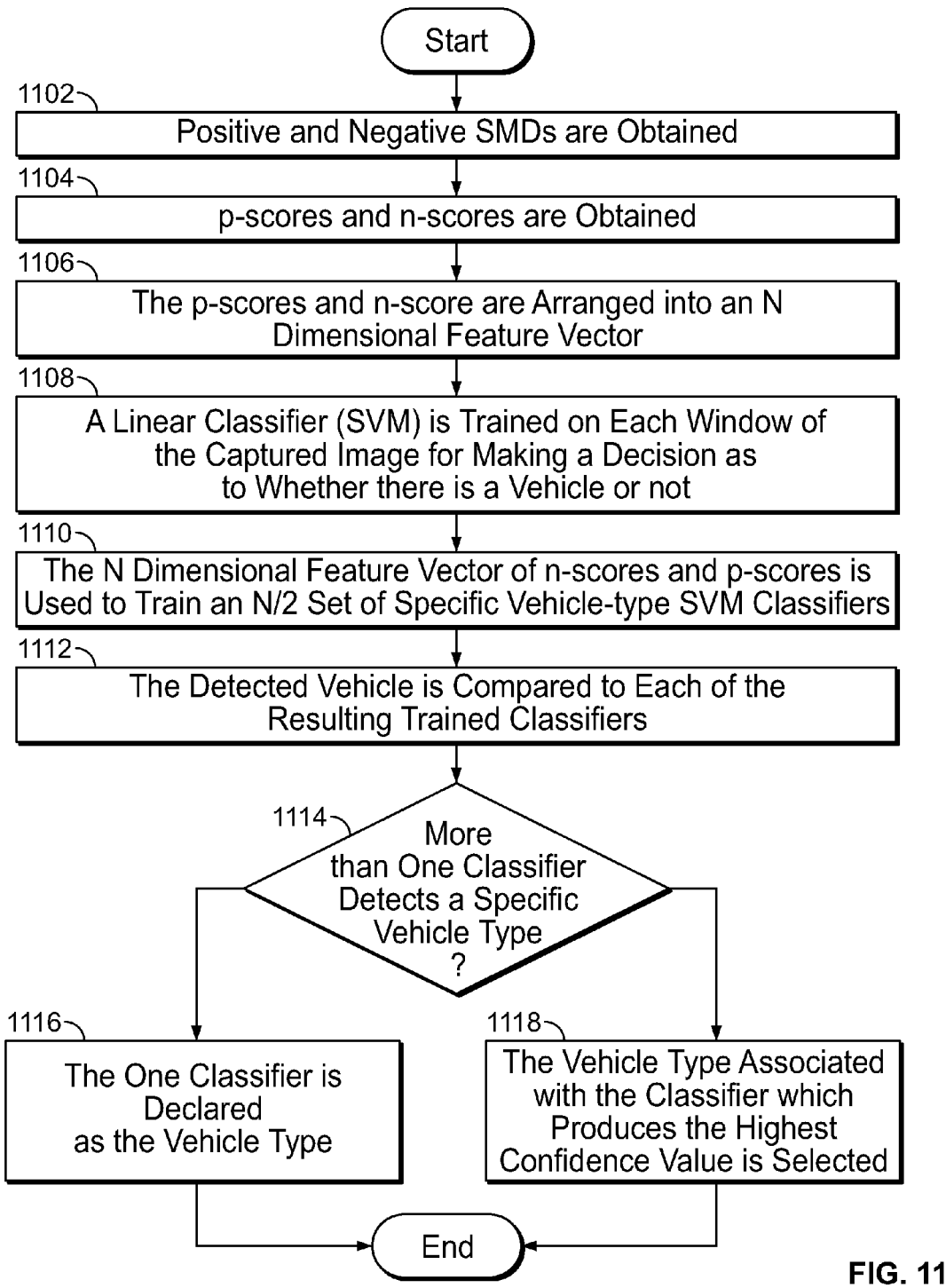
FIG. 11 is a process flow diagram exhibiting exemplary steps for classifying vehicles using a two stage classifier method based on p-scores and n-scores derived from the SMD of FIG. 9 and visually depicted in FIG. 10.

In Step S9, the detected vehicle 702 in the captured image 700 is classified using a two stage classifier method based on the derived p-scores and n-scores as depicted in the process flow diagram of FIG. 11. Once the relevant positive and negative feature match distributions (SMDs) are obtained in step 1102 and p-scores and n-scores are obtained in step 1104, in step 1106, the p-scores and n-score are arranged into an N-dimensional feature vector where N is the total number of p-scores and n-scores (e.g., 18 dimensions for the current example). In step 1108, a linear classifier, preferably a support vector machine classifier (SVM), is trained on each window of the captured image 700 for making a decision as to whether there is a vehicle type match or not. In step 1110, the N dimensional feature vector of n-scores and p-scores is used to train an N/2 set of specific vehicle-type SVM classifiers. In step 1112, the detected vehicle 702 is compared to each of the resulting trained classifiers. If, in step 1114, only one classifier detects a specific vehicle type, then in step 1116, this classification is declared as the vehicle type. If, in step 1114, more than one classifier "fires," then, in step 1118, the "best" vehicle type is chosen, where "best" is based on a confidence values employed in each SVM that "fired." The vehicle type associated with the classifier which produces the highest confidence value is selected.

As first mentioned with reference to FIGS. 3A, 3B, and step S2, a preferred image-based method for detecting the presence, location, and pose of a vehicle in a captured still image or for sequence of video images is described hereinbelow, according to an embodiment of the present invention. The method employs discriminative learning of vehicle parts and RANSAC-based model fitting first in a training phase of multi-class classifiers, and in a runtime pass, a test image or sequence of video images is fed to the multi-class classifiers to render a decision about the presence of a vehicle in a region-of-interest (ROI) of the input image(s), and if present, the pose of the detected vehicle.

Figure 12:
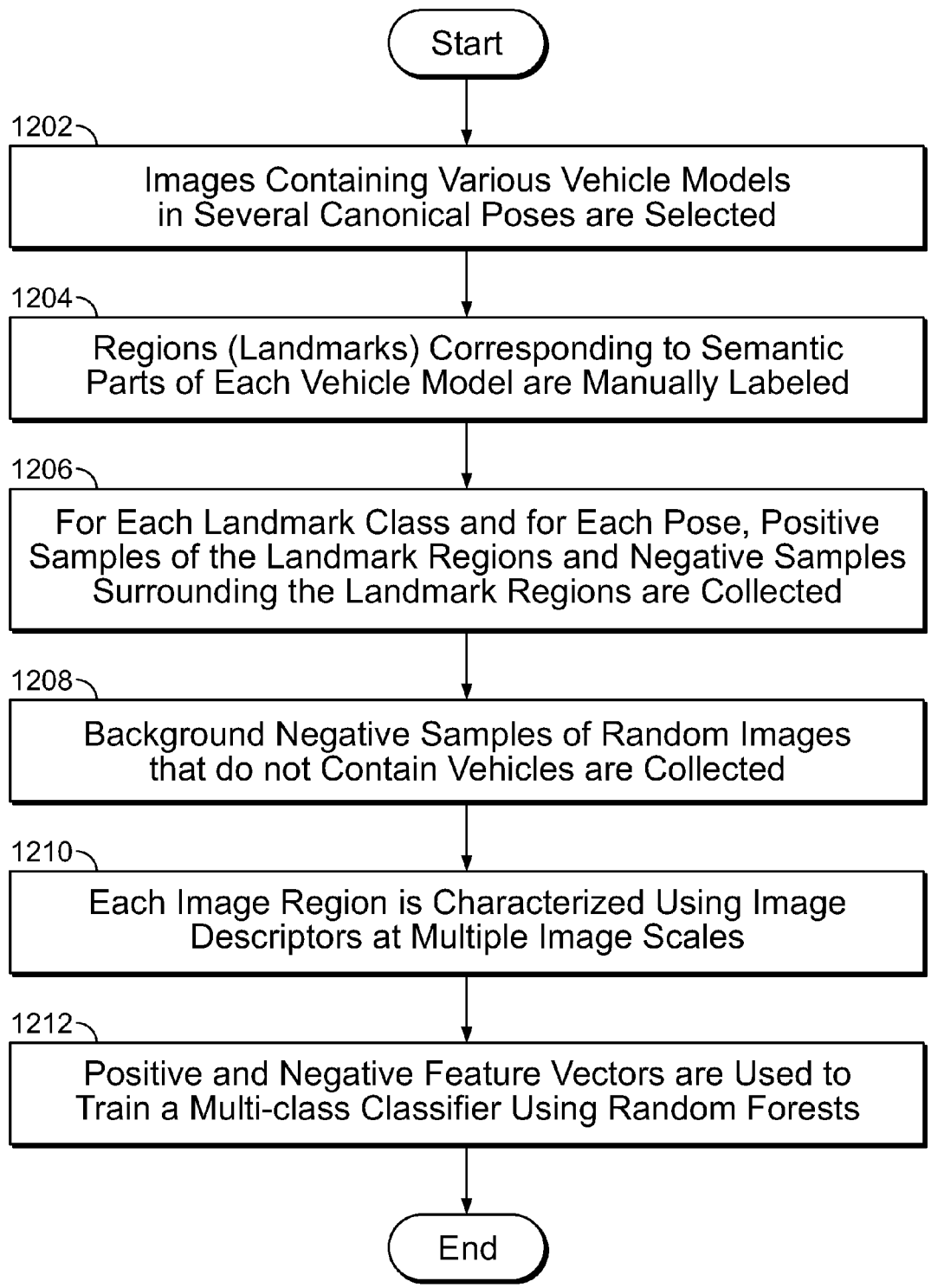
FIG. 12 is a process flow diagram illustrating exemplary steps of a runtime phase for a method for detecting the presence and location of a vehicle part in a captured still image or sequence of images, according to an embodiment of the present invention.

FIG. 12 is a process flow diagram illustrating exemplary steps of a training phase of a method for detecting the presence, location, and pose of a vehicle in a captured still image or in a sequence of images, according to an embodiment of the present invention. Referring now to FIG. 12, in step 1202, (color) images containing various vehicle models (e.g., cars, vans, SUVs, pick-up trucks, etc.) in several canonical poses (e.g., side, front, back, oblique views, etc.) are selected. In step 1204, regions (i.e., collections of pixels or vehicle landmarks) corresponding to semantic parts of each vehicle model (e.g., headlight, taillight, windshield area, etc.) are manually labeled. The labeling is done per landmark and canonical pose (i.e., all of the headlights for side-views, front views, etc.) are collected. The vehicle models are labeled to be at a canonical image size.

In step 1206, for each landmark class (e.g., a taillight region in a side-view) and for each pose, positive samples of the landmark regions and negative samples surrounding the landmark regions are collected. Note that negative sample regions are from image samples containing vehicles. The role of negative samples is to improve the discrimination of identifying a given part in an image. In addition to extraction of positive and negative samples for each landmark and pose, in step 1208, background negative samples of random images that do not contain vehicles are collected.

In step 1210, each image region is characterized using image descriptors at multiple image scales. Although any suitable image descriptor may be employed to characterize the image regions, HoG descriptors are preferred. HoG feature vectors for positive and negative parts for the landmarks and the background are formed. In step 1212, the positive and negative feature vectors are used to train a multi-class classifier using random forests. As used herein, a forest of classifiers refers to a collection of binary tree classifiers, wherein at each node of a tree, a binary (i.e., present or not present) classification decision is made. As used herein, a random forest denotes a collection of random trees. Each random-tree is a multi-class classifier for the landmarks+background which provides a computer implemented system with a probability of having a certain class of vehicle landmark at each pixel image location. In a preferred embodiment, one random forest per viewpoint (pose type) and N+1 random trees per forest (N positive classes and 1 negative class) are employed (N is preferably 100).

Figure 13:
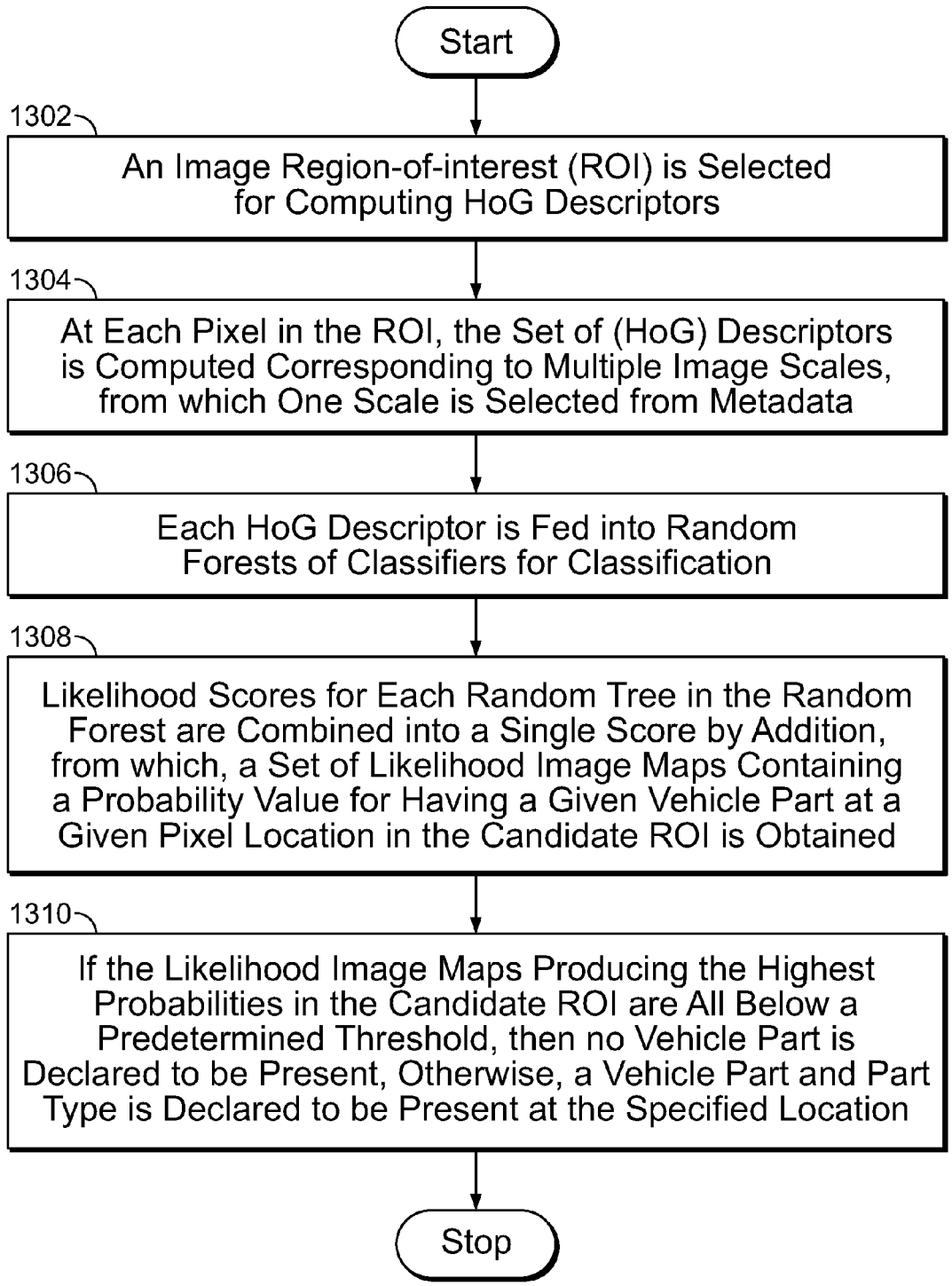
FIG. 13 is a process flow diagram illustrating exemplary steps of a runtime phase for a method for determining the pose of a vehicle detected in a captured still image or sequence of video images, according to an embodiment of the present invention.

FIG. 13 is a process flow diagram illustrating exemplary steps of a runtime phase for a method for detecting the presence and location of a vehicle in a captured still image or sequence of images, according to an embodiment of the present invention. Referring now to FIG. 13, in step 1302, an image region-of-interest (ROI) is selected for computing HoG descriptors. The ROI may be the whole image, as when vehicles are to be detecting in static images, or in the case of a series of images (e.g., of moving cars in a video), the ROI may be estimated as a foreground moving mask and a foreground-background mask may be computed either by background modeling for stationary cameras or by using optical flow and image-to-image alignment. In step 1304, at each pixel in the ROI, the set of (HoG) descriptors is computed corresponding to multiple image scales. Assuming that metadata from the camera is present (i.e., the scale and the pose of the camera in world coordinates obtained from step S1 of FIGS. 3A and 3B above), only one scale is selected from the metadata.

In Step 1306, each HoG descriptor is fed into the random forests for classification. For each canonical pose, each random tree from the corresponding random forest returns a likelihood score which measures the probability that the feature is either one of the landmarks or background. In step 1308, the likelihood scores for each random tree in the random forest are combined into a single score by addition. At the output of the vehicle part recognition stage, a set of likelihood image maps containing a probability value for having a given vehicle part at a given pixel location in the candidate ROI is obtained. Standard image processing techniques are employed to remove spurious detected parts. When prior knowledge is available in form of masks (e.g., road metadata, known pose of the camera, direction of motion), the masks are employed to mask the likelihood maps. In Step 1310, if the likelihood image maps producing the highest probabilities in the candidate ROI are all below a predetermined threshold, then no vehicle part is declared to be present, otherwise, a vehicle part and part type is declared to be present at the specified location.

Figure 14:
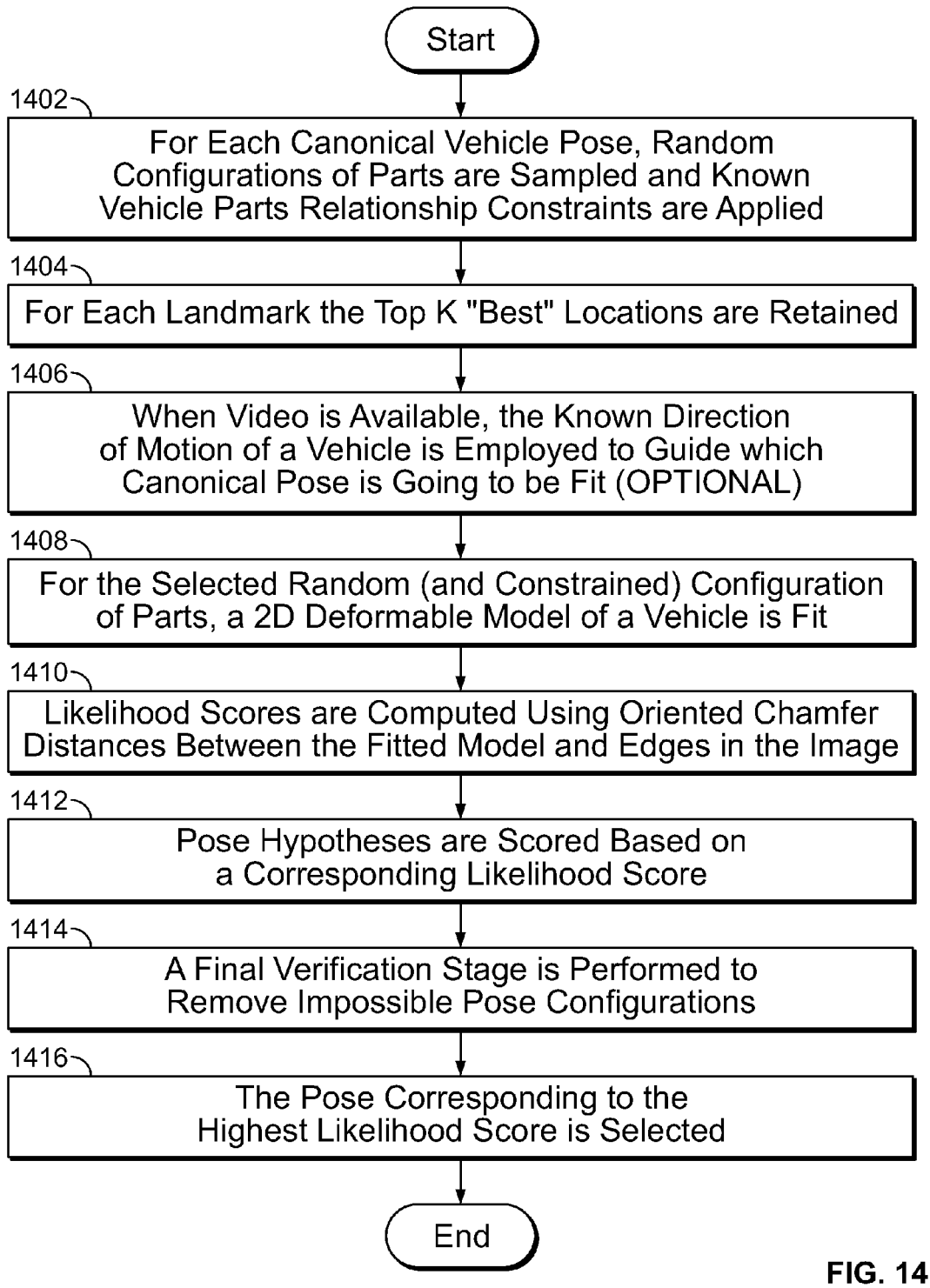
FIG. 14 is a process flow diagram illustrating exemplary steps of a runtime phase for a method for determining the pose of a vehicle detected in a captured still image or sequence of video images, according to an embodiment of the present invention.

FIG. 14 is a process flow diagram illustrating exemplary steps of a runtime phase for a method for determining the pose of a vehicle detected in a captured still image or sequence of video images, according to an embodiment of the present invention. A 2D deformable model containing preferably 10 landmarks for side-views and front/back views and 14 landmarks for oblique views is employed. The deformable model is used to constraint the spatial relationship between vehicle parts. As used herein, a "(2D) deformable model" refers to a collection of 2D locations of (vehicle) parts with a specific connectivity. The 2D deformable model prescribes how the parts can move with respect to each other. Referring now to FIG. 14, in step 1402, for each landmark, the top K (K=5-10) best locations are retained, wherein "best" is defined based on the following criteria: For each vehicle part a likelihood map is computed for the whole area which may contain a vehicle. That is, at each (x,y) pixel a score is computed from the random forest which encapsulates the confidence of having that part centered at that location. The "best" locations are those selected K locations throughout the image region such that the locations are not spatially close to each other: any locations closer than a threshold are removed. In an iterative process, the next best locations are selected from the remaining candidates. In step 1404, for each canonical vehicle pose, random configurations of parts are sampled and known vehicle parts relationship constraints are applied. A key reason for employing constrains on parts relationships is to minimize the number of part configurations that are generated. For example, in most images, vehicles are assumed to be relatively parallel with the x direction. Thus the direction corresponding to the direction of two wheels cannot deviate too much from the horizontal direction. Also, cars cannot be upside-down, therefore a roof part cannot be below the wheels. As a result, in optional step 1406, when video is available, the known direction of motion of a vehicle is employed to guide which canonical pose is going to be fit. For example, if a vehicle moves from left to right, then the constraint is used to guide the sampling of parts (taillight needs to be to the right of the head-light, etc).

In step 1408, for the selected random (and constrained) configuration of parts, a 2D deformable model of a vehicle is fit and in step 1410, likelihood scores are computed using Oriented Chamfer distance between the fitted model and the edges in the image. As used herein, an Oriented Chamfer measures the similarity between two shapes (i.e., contours). It is defined as a combination of two distance terms: (i) the distance between the respective (x,y) locations, wherein for each (x,y) location in a query contour, the (u,v) closest location in the reference contour is computed; and, (ii) the angle distance between the orientations at (x,y) and (u,v) locations. The standard Chamfer distance has only an (i) component. The oriented Chamfer (hence its name) penalizes different orientations among the candidate locations and it ensures that shapes have a similar first derivative. One can view the Oriented Chamfer distance as measuring how well the outline of 2D landmark locations of a resulted pose fit matches the edge map in the putative image region. To improve the discriminability of a Oriented Chamfer likelihood score, short and weak edges are removed from the computation. These short and weak edges usually are caused by highlights and random background patterns. In step 1412, pose hypotheses are scored based on a corresponding likelihood. In step 1414, a final verification stage is performed to remove impossible pose configurations. In step 1416, the pose corresponding to the highest likelihood score is chosen.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A method performed by a processor for detecting presence of a vehicle in one or more images, comprising:
    determining a region of interest (ROI) in the one or more images, without a priori knowledge of whether the vehicle is present in the ROI;
    computing a plurality of sets of image descriptors, each one of the sets of image descriptors corresponding to a location within the ROI;
    classifying each of the sets of descriptors, using a multi-class classifier comprising a structure of related classifiers for a set of associated vehicle parts, to obtain a likelihood value of whether a vehicle part is present at the location corresponding to the set of descriptors being classified; and
    determining whether the vehicle is likely present within the ROI based on a comparison between a function of the obtained likelihood values and a predetermined threshold value;
    wherein the multi-class classifier used to classify each of the sets of descriptors is trained by:
        selecting a plurality of training images containing vehicle models;
        semantically labeling regions in the training images corresponding to parts of the vehicle models;
        collecting a set of positive samples comprising image content inside of the labeled regions from the plurality of training images, and a set of negative samples comprising image content outside of the labeled regions from the plurality of training images;
        characterizing the samples so as to derive positive and negative feature vectors for the samples; and
        using the positive and negative feature vectors to train the multi-class classifier.

2. The method of claim 1 applied to a series of images, and wherein determining the ROI further comprises detecting foreground motion within the series of images, and defining the ROI based on the detected foreground motion.

3. The method of claim 1, further comprising:
    masking the obtained likelihood values with known metadata related to the one or more images to improve vehicle part detection.

4. The method of claim 3, wherein the metadata comprises one or more of road metadata, pose of a camera capturing the one or more images, and direction of motion across the one or more images.

5. The method of claim 1 wherein training the multi-class classifier used to perform the classifying step further comprises:
    selecting the plurality of training images containing the vehicle models in a plurality of canonical poses;
    collecting the set of positive samples comprising image content inside of the labeled regions from the plurality of training images for each of the plurality of canonical poses, and collecting the set of negative samples comprising image content outside of the labeled regions from the plurality of training images for each of the plurality of canonical poses; and
    collecting a set of images containing no vehicle models as additional negative samples.

6. The method of claim 1, wherein the multi-class classifier comprises a random forest.

7. The method of claim 1, wherein the structure of related classifiers comprises a collection of tree classifiers.

8. The method of claim 7, wherein each of the tree classifiers outputs a binary classification decision as to whether an input image contains a given vehicle part or not.

9. The method of claim 1, wherein the classifying step is performed using a plurality of multi-class classifiers, each of the multi-class classifiers corresponding to a canonical vehicle poses.

10. The method of claim 1, wherein the sets of image descriptors are computed with respect to a plurality of image scales.

11. The method of claim 1, wherein the image descriptors comprise HoG feature descriptors.

* * * * *